US012730520B2

(12) United States Patent
de Goumoëns et al.

(10) Patent No.: US 12,730,520 B2
(45) Date of Patent: Sep. 8, 2026

(54) KEYBOARD WITH UNIVERSAL SMART KEY SWITCH ADAPTOR

(71) Applicant: Logitech Europe S.A., Lausanne (CH)

(72) Inventors: Frédéric Alexis Guillaume de Goumoëns, Rolle (CH); Jan Stoeckli, Jongny (CH); Léo Zeender, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/896,565

(22) Filed: Sep. 25, 2024

(65) Prior Publication Data

US 2025/0377736 A1 Dec. 11, 2025

Related U.S. Application Data

(60) Provisional application No. 63/657,817, filed on Jun. 8, 2024.

(51) Int. Cl.
*G06F 3/02* (2006.01)
*H01H 13/7057* (2006.01)

(52) U.S. Cl.
CPC ....... *G06F 3/0219* (2013.01); *H01H 13/7057* (2013.01); *H01H 2237/008* (2013.01)

(58) Field of Classification Search
CPC .............. G06F 3/0219; H01H 13/7057; H01H 2237/008
See application file for complete search history.

(56) References Cited

U.S. PATENT DOCUMENTS

| | | | | |
|---|---|---|---|---|
| 10,866,619 | B1 * | 12/2020 | Bushnell | G06F 1/1656 |
| 11,012,069 | B2 * | 5/2021 | Moseley | H03K 17/955 |
| 11,042,224 | B1 * | 6/2021 | Stoeckli | G06F 3/0202 |
| 11,048,344 | B1 * | 6/2021 | Drezet | H01F 7/20 |
| 11,150,741 | B1 * | 10/2021 | Stoeckli | G06F 1/3259 |
| 11,469,060 | B1 * | 10/2022 | Hsu | G02B 6/0046 |
| 11,914,795 | B1 * | 2/2024 | Krishnakumar | G06F 3/0202 |
| 11,914,796 | B1 * | 2/2024 | Goh | H03K 17/972 |
| 12,530,090 | B1 * | 1/2026 | Goh | G06F 3/0238 |
| 2008/0042980 | A1 * | 2/2008 | Bowen | G06F 3/0234 345/168 |
| 2008/0131184 | A1 * | 6/2008 | Brown | H01H 13/83 400/490 |
| 2012/0228111 | A1 * | 9/2012 | Peterson | H03K 17/9622 200/600 |
| 2015/0061901 | A1 * | 3/2015 | Casparian | H01H 13/705 341/22 |
| 2018/0083619 | A1 * | 3/2018 | Hou | H03K 17/969 |
| 2018/0240622 | A1 * | 8/2018 | Yuan | H01H 13/84 |
| 2019/0319620 | A1 * | 10/2019 | Moseley | G06F 3/047 |

(Continued)

*Primary Examiner* — Ibrahim A Khan
(74) *Attorney, Agent, or Firm* — Kilpatrick Townsend & Stockton LLP

(57) ABSTRACT

A key structure comprising a housing, a plunger extending from a top side of the housing and configured to be depressed and travel along a range of motion, a motion sensor system, and driving electronics, all contained within the housing, the sensor system configured to detect movement of the depressible plunger along the range of motion and generate corresponding travel data. One or more processors can be configured to determine a position of the plunger along the range of motion based on the travel data.

22 Claims, 17 Drawing Sheets
(14 of 17 Drawing Sheet(s) Filed in Color)

(56) References Cited

U.S. PATENT DOCUMENTS

| | | | | |
|---|---|---|---|---|
| 2019/0393003 | A1* | 12/2019 | Wang | H01H 13/52 |
| 2020/0218362 | A1* | 7/2020 | Madsen | A63F 13/218 |
| 2021/0272760 | A1* | 9/2021 | Knops | H01H 13/83 |
| 2022/0122787 | A1* | 4/2022 | Ruff | H01H 13/70 |
| 2023/0154698 | A1* | 5/2023 | Tubre | H01H 13/64 200/341 |
| 2024/0353935 | A1* | 10/2024 | Klinkman | G06F 3/0202 |

* cited by examiner

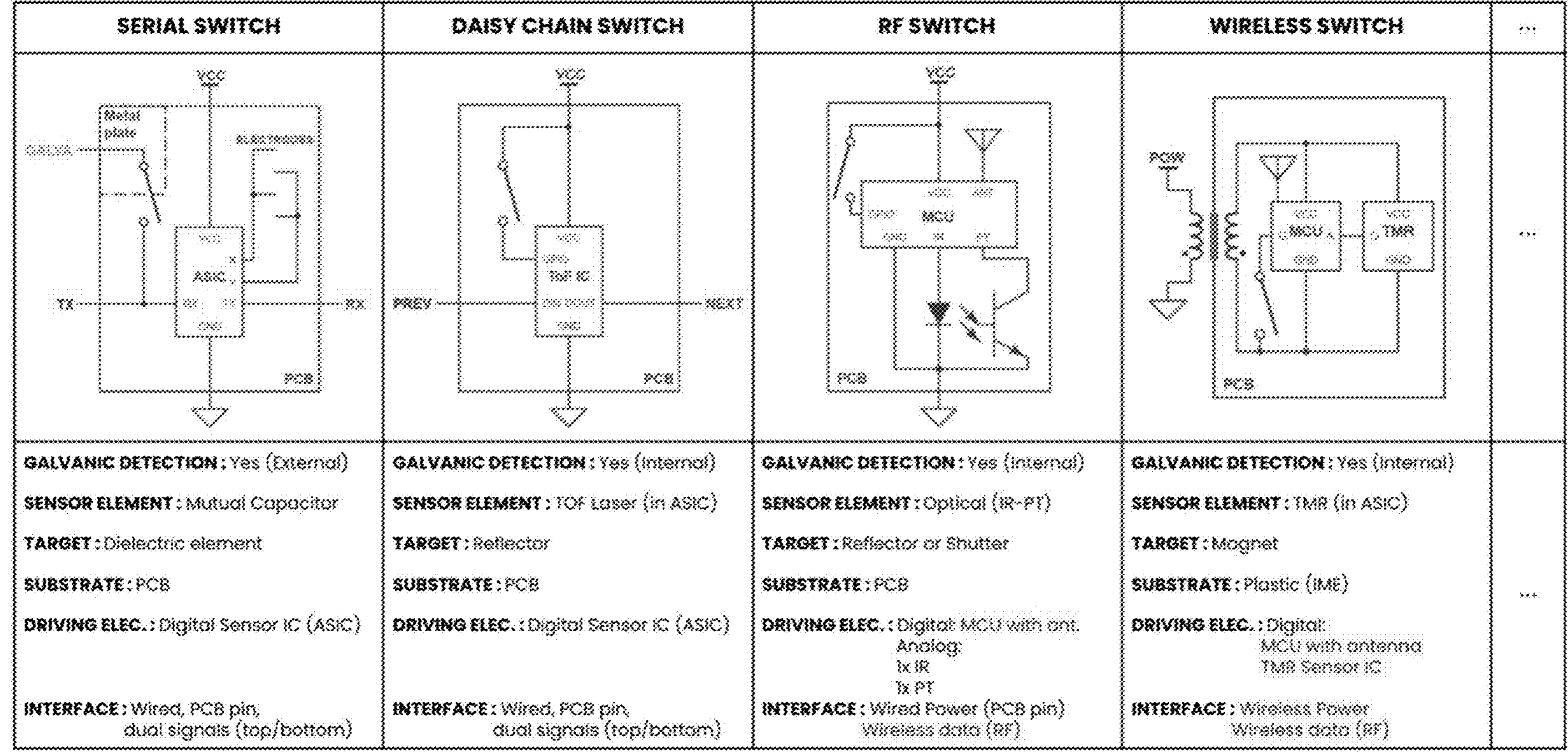

| SERIAL SWITCH | DAISY CHAIN SWITCH | RF SWITCH | WIRELESS SWITCH | ... |
|---|---|---|---|---|
| | | | | ... |
| **GALVANIC DETECTION :** Yes (External)<br>**SENSOR ELEMENT :** Mutual Capacitor<br>**TARGET :** Dielectric element<br>**SUBSTRATE :** PCB<br>**DRIVING ELEC. :** Digital Sensor IC (ASIC)<br>**INTERFACE :** Wired, PCB pin, dual signals (top/bottom) | **GALVANIC DETECTION :** Yes (Internal)<br>**SENSOR ELEMENT :** TOF Laser (in ASIC)<br>**TARGET :** Reflector<br>**SUBSTRATE :** PCB<br>**DRIVING ELEC. :** Digital Sensor IC (ASIC)<br>**INTERFACE :** Wired, PCB pin, dual signals (top/bottom) | **GALVANIC DETECTION :** Yes (Internal)<br>**SENSOR ELEMENT :** Optical (IR-PT)<br>**TARGET :** Reflector or Shutter<br>**SUBSTRATE :** PCB<br>**DRIVING ELEC. :** Digital: MCU with ant. Analog: 1x IR 1x PT<br>**INTERFACE :** Wired Power (PCB pin) Wireless data (RF) | **GALVANIC DETECTION :** Yes (Internal)<br>**SENSOR ELEMENT :** TMR (in ASIC)<br>**TARGET :** Magnet<br>**SUBSTRATE :** Plastic (IME)<br>**DRIVING ELEC. :** Digital: MCU with antenna TMR Sensor IC<br>**INTERFACE :** Wireless Power Wireless data (RF) | ... |

*FIG. 8B*

DYNAMIC SCANNING - SAMPLING RATE

KEYBOARD WITH UNIVERSAL SMART KEY SWITCH ADAPTOR

CROSS-REFERENCES PARAGRAPH FOR RELATED APPLICATIONS

This application is a non-provisional application and claims the benefit and priority of U.S. Provisional Application No. 63/657,817, filed on Jun. 8, 2024, and titled "KEYBOARD WITH UNIVERSAL SMART KEY SWITCH ADAPTOR," which is hereby incorporated by reference in its entirety for all purposes.

BACKGROUND

Computer peripheral devices are commonplace in modern society and are typically used to convert human-induced analog inputs (e.g., touches, clicks, motions, touch gestures, button presses, scroll wheel rotations, etc.) made in conjunction with computer peripheral devices into digital signals for computer processing. A computer peripheral device, or more broadly, an input device, can include any device that can provide data and control signals to a computing system. Some non-limiting examples of input devices include keyboards, computer mice, virtual reality and/or augmented reality controllers, touch pads, remote controls, gaming controllers, joysticks, trackballs, presenters, and the like.

Input devices have undergone many marked improvements over the last several decades. In some contemporary input devices, such as keyboards, analog keys have become popular for certain applications like competitive gaming. Analog keys can provide better resolution in key press detection that extends beyond a simple make or break connection, as found in conventional galvanic keyswitches, but can come at a significant increase in production cost, system complexity, power requirements, and keyswitch addressing delay. As such, better solutions are needed.

Unless otherwise indicated herein, the materials described in this section are not prior art to the claims in this application and are not admitted as being prior art by inclusion in this section.

SUMMARY

In certain embodiments, a key structure comprises: a housing; a plunger extending from a top side of the housing and configured to be depressed and travel along a range of motion; and a motion sensor system contained within the housing and configured to detect movement of the plunger along the range of motion and generate corresponding travel data, wherein one or more processors are configured to determine a position of the plunger along the range of motion based on the travel data. The key structure can further include driving electronics configured to control the motion sensor system. The driving electronics can be contained within the housing of the key structure, external to the housing of the key structure, or a combination thereof. The key structure can include a substrate with electrical traces, wherein the motion sensor system is integrated on the substrate. The substrate can be a printed circuit board (PCB), membrane, integrated circuit within key structure, embedded traces within key structure, or other substrate with electrical traces, as would be appreciated by one of ordinary skill in the art with the benefit of this disclosure. The motion sensor system can include an optical sensor, mutual capacitance sensor, an inductive sensor, a magnetic sensor, or other suitable sensing technology.

When the motion sensor system includes an optical sensor, the substrate can include a light emitting element and a light detection element, wherein (1) the plunger includes a shutter that blocks an amount of light from the light emitting element from reaching the light detection element based on the position of the plunger along the range of motion; or (2) the plunger includes a reflector that reflects an amount of light from the light emitting element on to the light detection element based on the position of the plunger along the range of motion. When the motion sensor system includes an inductive sensor, the substrate can include: a current driver; and an inductive coil driven by the current driver, wherein the plunger includes an electrically conductive element, and wherein a magnetic field produced by the inductive coil changes based on the position of the plunger along the range of motion. When the motion sensor system includes a magnetic sensor, the substrate can include: a Hall Effect sensor or tunneling magnetoresistance (TMR) sensor, wherein the plunger includes a magnet, and wherein a strength of a magnetic field produced by the magnet detected by the Hall Effect or TMR sensor changes based on the position of the plunger along the range of motion. When the motion sensor system includes a mutual capacitance sensor, the substrate can include a plurality of conductive elements having a mutual capacitance between them; a dielectric element coupled to the plunger; and a digital sensor integrated circuit configured to drive and read an amount of the mutual capacitance between the plurality of conductive elements, wherein a strength of a mutual capacitance between the plurality of conductive elements changes based on the position of the plunger and dielectric element relative to the plurality of conductive elements. In some embodiments, the key structure can further include a galvanic contact for a galvanic switch.

In some embodiments, a substrate with electrical traces configured to be housed within a key structure for a keyboard can have integrating thereon: a motion sensor system configured to detect movement of a target element coupled to a depressible plunger of the key structure along a range of motion and generate corresponding travel data; driving electronics configured to control the motion sensor system; and an interface circuit including a multiple I/O pins operable to: receive a drive signal to drive the motion sensor system; receive electrical power to operate the motion sensor system; and provide an output signal including data corresponding to the motion sensor system. The substrate can be a printed circuit board, membrane, integrated circuit within the key structure, or embedded traces within the key structure, among other types. The multiple I/O pins are further operable to: receive a drive signal to drive a galvanic detection system; and provide an output signal corresponding to a state of the galvanic detection system. In some aspects, the interface circuit is further configured to provide an identification signal operable to identify the key structure. In some cases, the sensor system is an analog linear motion sensor system that utilizes: an optical sensor system; an inductive sensor system; a magnetic sensor system; or a mutual capacitance sensor system. When the sensor system is an analog linear motion sensor system and includes an optical sensor system, the optical sensor system can include a light emitting element, a light detection element, and (1) a shutter element coupled to the plunger that blocks an amount of light from the light emitting element from reaching the light detection element based on a position of the plunger along the range of motion; or (2) a reflector coupled to the plunger that reflects an amount of light from the light emitting element on to the light detection element based on the position of the plunger along the range of motion.

In certain embodiments, when the sensor system is an analog linear motion sensor system and includes an inductive sensor system, the inductive sensor system can include a current driver; and an inductive coil driven by the current driver, wherein the plunger includes an electrically conductive element, and wherein a magnetic field produced by the inductive coil changes based on a position of the plunger along the range of motion. In some embodiments, when the sensor system is an analog linear motion sensor system and includes a magnetic sensor system, the magnetic sensor system can include a Hall Effect sensor, wherein the plunger includes a magnet, and wherein a strength of a magnetic field produced by the magnet detected by the Hall Effect sensor changes based on a position of the plunger along the range of motion. In some cases where the sensor system is an analog linear motion sensor system and includes a mutual capacitance sensor system, the mutual capacitance sensor system includes a plurality of conductive elements having a mutual capacitance between them; a dielectric element coupled to the plunger; and a digital sensor integrated circuit configured to drive and read an amount of the mutual capacitance between the plurality of conductive elements, wherein a strength of a mutual capacitance between the plurality of conductive elements changes based on a position of the plunger and dielectric element relative to the plurality of conductive elements.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features of the various embodiments described above, as well as other features and advantages of certain embodiments of the present invention, will be more apparent from the following detailed description taken in conjunction with the accompanying drawings, in which:

FIG. 8B shows simplified circuit diagrams for various analog sensing circuits for smart keyswitches, according to certain embodiments;

Throughout the drawings, it should be noted that like reference numbers are typically used to depict the same or similar elements, features, and structures.

DETAILED DESCRIPTION

Figure 1:
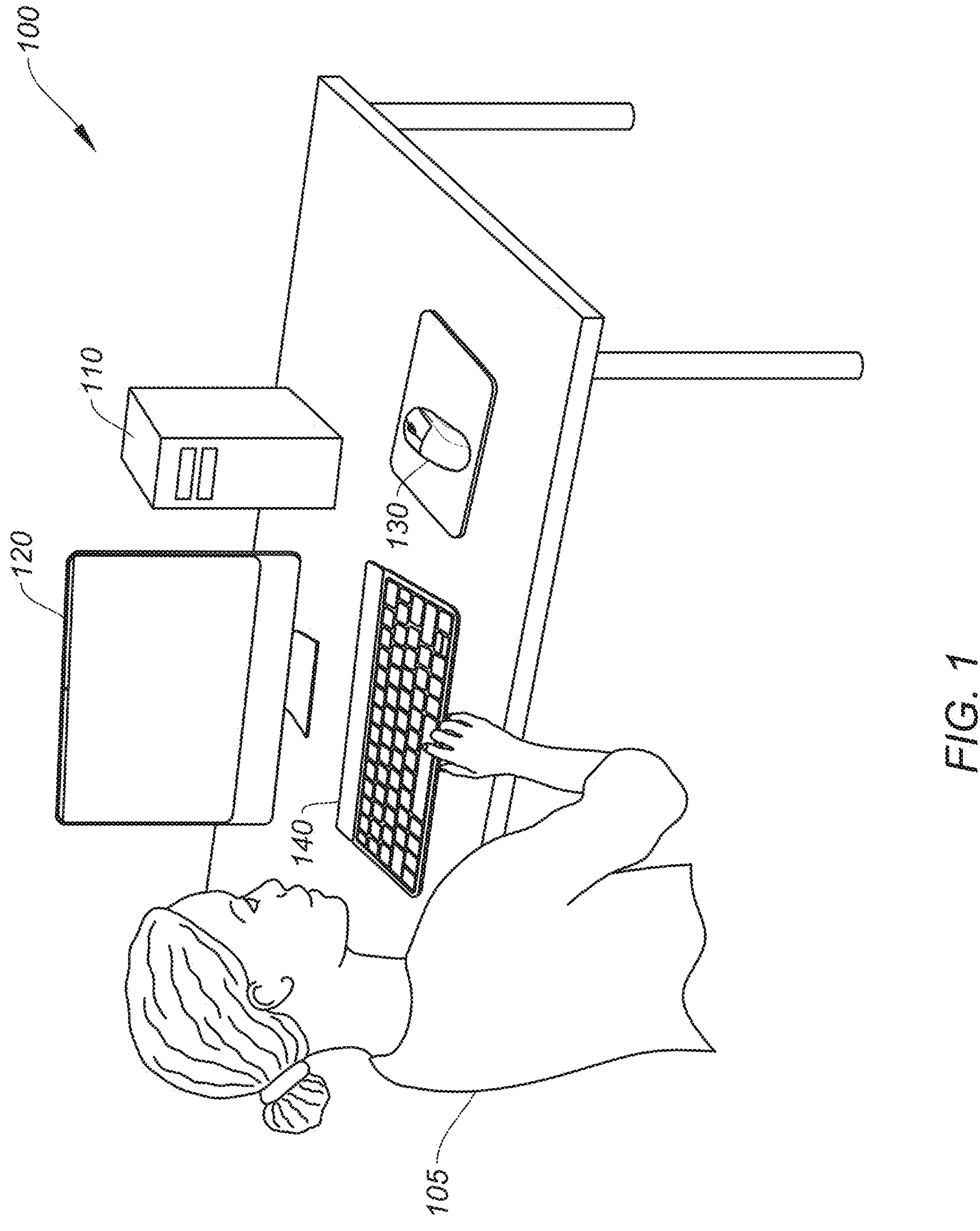
FIG. 1 shows a simplified example of a computer system that can include any of a variety of host computing devices and computer peripheral devices, including computer peripheral devices that can be configured to perform aspects of the various inventive concepts described herein.

Aspects of the present disclosure relate generally to computer peripheral devices, and more particularly to a universal keyboards or keyed devices, smart keyswitches and keyswitch adaptors, and corresponding infrastructure, according to certain embodiments.

In the following description, various examples of universal keyboards, smart keyswitches, keyswitch adaptors, and corresponding infrastructure are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high-level summary is intended to provide a basic understanding of some of the novel innovations depicted in the figures and presented in the corresponding descriptions provided below. Aspects of the invention relate to smart keyswitches. For example, a mechanical keyboard smart switch may include an embedded analog sensing element (e.g., optical sensor, inductive sensor, magnetic sensor, capacitive sensor, etc.) configured to sense a displacement of a target (e.g., reflector, magnet, conductive element, etc.) coupled to a depressible plunger of the key switch, in addition to, or instead of, a binary galvanic contact-based detection. The smart keyswitches can have all of the specific driving electronics for the analog sensing element that can generate a signal (e.g., analog, digital—containing the plunger displacement information) embedded on a substrate (e.g., printed circuit board or "PCB") inside the keyswitch housing (body). In some cases, the smart keyswitches may include motion sensing circuitry, but none or some of the driving electronics. The driving electronics and the sensing element can be interfaced (e.g., powered, controlled, read) by main circuitry of a keyboard or keyed device. Thus, the smart keyswitch with integrated sensing allows for modular placement on a keyboard without needing dedicated infrastructure on the keyboard itself, allowing different keyswitch types (e.g., galvanic, optical, inductive, magnetic) to be swapped in because no particular sensing technology is permanently installed on the main keyboard PCB.

In some embodiments, a universal keyboard or keyed device can include a mechanical keyboard platform where the keyswitches can be mounted on a universal interface configured to allow any switch sensing technology (e.g., galvanic, optical, magnetic, inductive, capacitive) to be used at any keyswitch location on the keyboard, with no sensor or sensor support circuitry being needed on the keyboard PCB. The platform can drive and read information about the plunger position (e.g., with two or more values for the position) that is sensed from inside the keyswitch, and can power the keyswitches, regardless of the keyswitch sensing technology, and send or receive I/O signals from the keyswitch, whether digital, analog, or a combination thereof, as would be appreciated by one of ordinary skill in the art with the benefit of this disclosure.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 can include computer 110, monitor 120, computer mouse 130, and keyboard 140. In some cases, keyboard 140 can be a "qwerty" style keyboard, or any suitable input device (e.g., internet-of-things device, AR/VR controller, remote controller, or the like) with one or more keys that can be configured as analog keys with travel and force detection, as further described throughout this disclosure. For computer system 100, keyboard 140 can be configured to control various aspects of computer 110 and monitor 120, as would be appreciated by one of ordinary skill in the art with the benefit of this disclosure. The monitor 120, computer mouse 130, and keyboard 140 may be referred to generally as "computer peripheral devices" or "input devices." Computer peripheral devices 120-140 can be communicatively coupled to host computing device 110 and, in some cases, may be coupled to multiple host computing devices. Although many of the examples presented herein utilize analog keys in a keyboard-type computer peripheral device, it would be understood by those of ordinary skill in the art with the benefit of this disclosure that the usage of such structures can be applied to other types of input devices.

Computer 110 can be any suitable computing device including, but not limited to, a desktop computer, a laptop computer, a tablet or "phablet" computer, a smartphone, a PDA, a wearable device (e.g., smart watches, smart glasses), virtual reality/augmented reality (VR/AR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor(s) 210 of FIG. 2) to control aspects of the host computing device, for instance, via the one or more computer peripheral devices.

Figure 2:
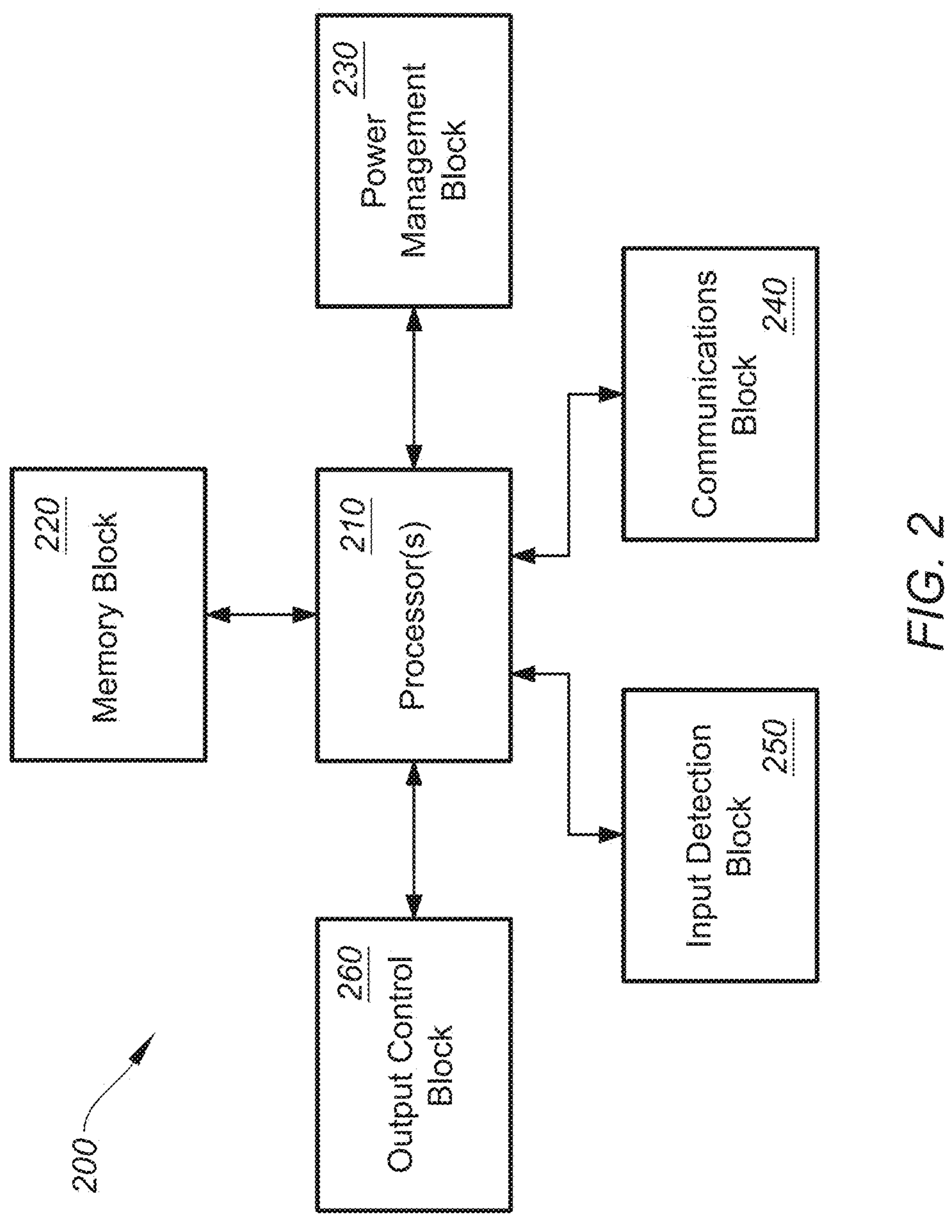
FIG. 2 shows a simplified block diagram of a system for operating a computer peripheral device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, a memory 220, a power management system 230, a communication module 240, an input detection module 250, and an output control module 260. Each of the system blocks 220-260 can be in electronic communication with processor (s) 210 (e.g., via a bus system). System 200 may include additional functional blocks that are not shown or discussed to prevent obfuscation of the novel features described herein. System blocks 220-260 (also referred to as "modules") may be implemented as separate blocks, or alternatively, more than one system block may be implemented in a single block. In the context described herein, system 200 can be incorporated into any computer peripheral devices (e.g., input devices) described or mentioned herein and may be further configured with any of the analog key structures presented herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of keyboard 140 (e.g., system blocks 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor(s) 210 to perform some or all of the various methods described throughout this disclosure. In some embodiments, multiple processors may enable increased performance characteristics in system 200 (e.g., speed and bandwidth), however, multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor(s) 210). Software can be implemented as a single program or a collection of separate programs and can be stored in non-volatile storage and copied in whole or in part to volatile working memory during program execution. In some embodiments, memory 220 may store data corresponding to inputs on the computer peripheral device, such as a detected movement of the computer peripheral device, a sensor (e.g., optical sensor, accelerometer, etc.), activation of one or more input elements (e.g., buttons, sliders, touch-sensitive regions, etc.), or the like. Stored data may be aggregated and sent via reports to a host computing device.

In certain embodiments, memory 220 can store the various data described throughout this disclosure. Memory 220 can be used to store any suitable data to perform any function described herein and as would be appreciated by one of ordinary skill in the art with the benefit of this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in part to volatile working memory during program execution. From a storage subsystem, processing devices can retrieve program instructions to execute various operations (e.g., software-controlled switches, etc.) as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cables to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements on an input device. For instance, input detection module 250 can detect user inputs from motion sensors, keys, or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 or subset thereof can be subsumed by processor(s) 210, or in combination therewith.

In some embodiments, input detection module 250 can detect a touch or touch gesture on one or more touch sensitive surfaces on keyboard 140. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection block 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of a computer peripheral device. For example, input detection module 250 optical sensor(s) such as IR LEDs and an imaging array of photodiodes to detect the movement of a computer peripheral device relative to an underlying surface. A computer peripheral device may optionally include movement tracking hardware that utilizes coherent (laser) light. Movement tracking can provide positional data (e.g., delta X and delta Y data from the last sampling) or lift detection data. For example, an optical sensor can detect when a user lifts the computer peripheral device (e.g., computer mouse 130) off an underlying surface (also referred to as a "work surface") and can send that data to processor(s) 210 for further processing. In some embodiments, processor(s) 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation. In some embodiments, input detection block 250 can control aspects of one or more sensing elements, as described herein.

In some embodiments, output control module 260 can control various outputs for a corresponding computer peripheral device. For instance, output control module 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus subsystem to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations (e.g., by programming a processor or providing appropriate control circuitry) and various blocks might or might not be reconfigurable depending on how the initial configuration is obtained.

System 200 can be applied in whole or in part (e.g., a subset of system blocks 210-260), or with additional blocks to realize the various inventive concepts described herein. In some cases, multiple systems 200 or portions thereof can be applied to a computer peripheral device. For example, some or all of the smart keyswitch embodiments described herein (see, e.g., FIGS. 6A-9) can incorporate aspects of system 200 to control sensing (e.g., optical, inductive, magnetic, mechanical), communication via I/O lines, wireless communications in some cases, output control (e.g., LEDs, haptics, etc.), or any other aspect via blocks 210-260, as would be appreciated by one of ordinary skill in the art with the benefit of this disclosure. Similarly, embodiments of the main PCB can use some or all aspects of system 200 to communicate with smart switches (e.g., via a universal socket) with dedicated drive/sense lines, with partial scanning technology using subarrays, as described in U.S. application Ser. No. 18/457,974, which is hereby incorporated by reference in its entirety for all purposes, or the like, as would be appreciated by one of ordinary skill in the art with the benefit of this disclosure.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other subsystems as required by design. For example, input detection module 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to apply to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
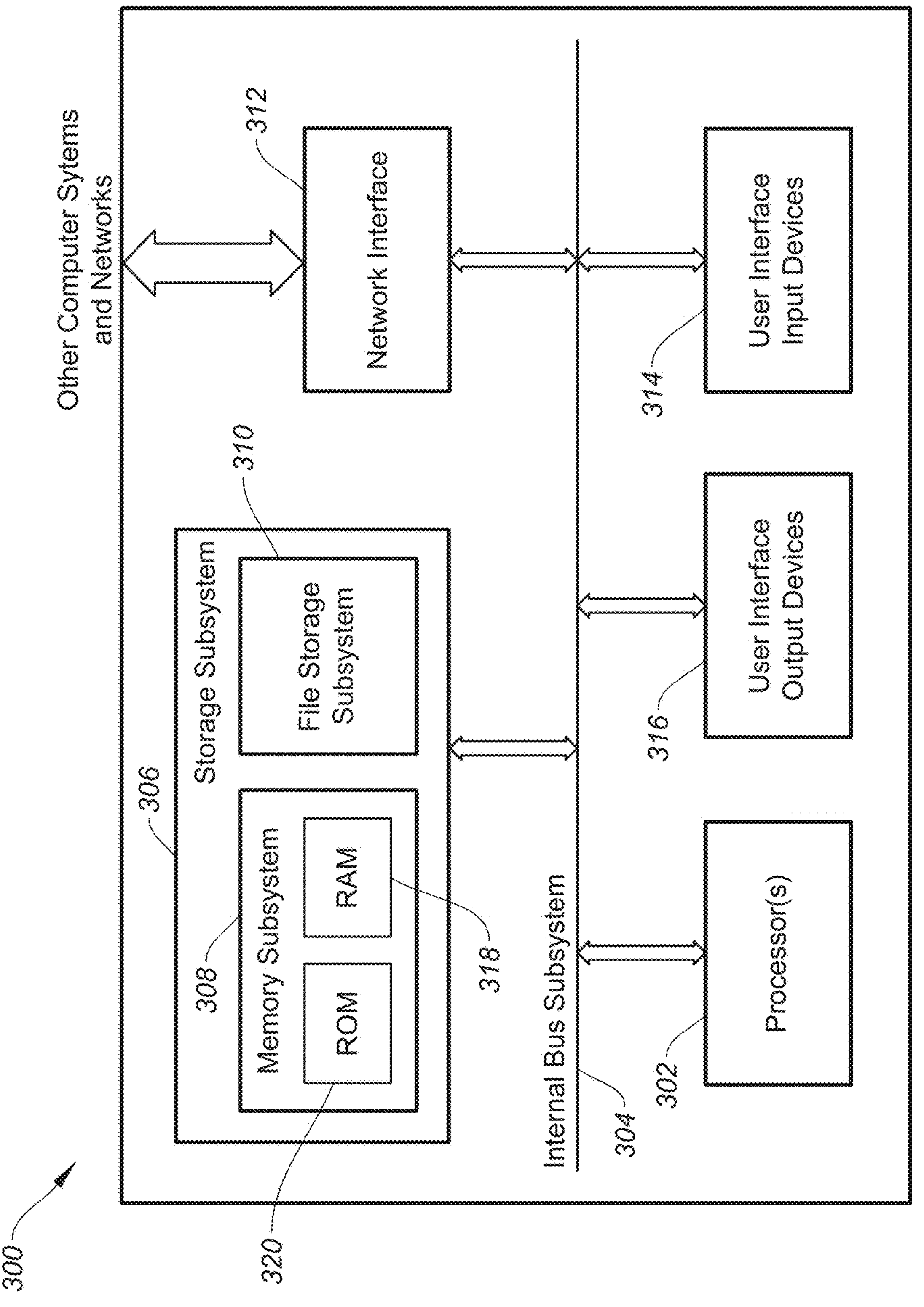
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed-up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing the methodologies described herein. Code modules (e.g., instructions stored in memory) may be implemented within a processor or external to the processor. As used herein, the term "memory" refers to a type of long term, short term, volatile, nonvolatile, or other storage medium, and is not to be limited to any particular type of memory or number of memories, or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps, and means described throughout the present disclosure may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special-purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations (e.g., by programming a processor or providing appropriate control circuitry) and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Universal Smart Keyswitch and Adaptor

A contemporary trend in keyed gaming devices (e.g., keyboards) includes the use of analog keyswitches, which enables more functional options beyond a binary on/off state as found in conventional mechanical-type varieties. For example, some gaming keyboards now implement mainly three different types of switch detection including (1) galvanic; (2) non-contact digital (e.g., optical); and (3) analog, and the novel smart switch technology described herein is compatible with all three. The sensing technology can be integrated and typically soldered onto the main PCB and interfaces with each key structure (with the analog keyswitch) to facilitate analog sensing. Certain embodiments of the invention fully integrates the sensing technology within the keyswitch itself, which allows for hot swapping of keyswitches for implementing any desired sensing technology within the same keyboard, which still allowing the keyboard itself to remain compatible with galvanic switches on the market. Another benefit of the implementation of smart switches, as described herein, is that the sensor can be wholly located inside the key housing, so it is not sensitive of PCB or key frame displacement, which is a very commonplace problem with cotemporary gasket mounted keyboards. In addition, the modularity and upgradability of the smart switch concept brings some good advantages in terms of sustainability. The switches can easily be replaced or upgraded instead of replacing the full keyboard. It is noteworthy that the main PCB of a keyboard is typically the main source of $CO_2$. Also, a failure of an analog sensor can be amended by simply replacing the faulty keyswitch in question, rather than replacing the entire keyboard. From a keyboard manufacturer standpoint, the smart switch can allow the multiplication of keyboard designs (e.g., ID or switch mounted) very quickly based on a single stable platform. While the smart switch presents significant value due to its swapability, the architecture and the platformability remains valid and valuable for soldered switches as well.

Thus, some embodiments include a keyboard with mechanical keyboard keyswitches with embedded sensing elements (e.g., optical, inductive, magnetic, capacitive, etc.) that is typically configured to sense a displacement of a sense target ("target") coupled to a plunger on the keyswitch, in addition to (or instead of) galvanic contact-based detection. In such cases, the specific driving electronics for the sensing element, configured to generate a signal (e.g., analog or digital) containing the plunger displacement information (e.g., magnitude of displacement, acceleration, etc.), is also embedded on a substrate inside of the keyswitch body, and the driving electronics and sensing elements can be interfaced (e.g., powered, controlled, read, etc.) by the keyboard main circuitry (e.g., system 200), as further described below. In some cases, the analog sensing function could also be implemented through a force sensor, as would be appreciated by one of ordinary skill in the art with the benefit of this disclosure.

Figures 4A, 4B:
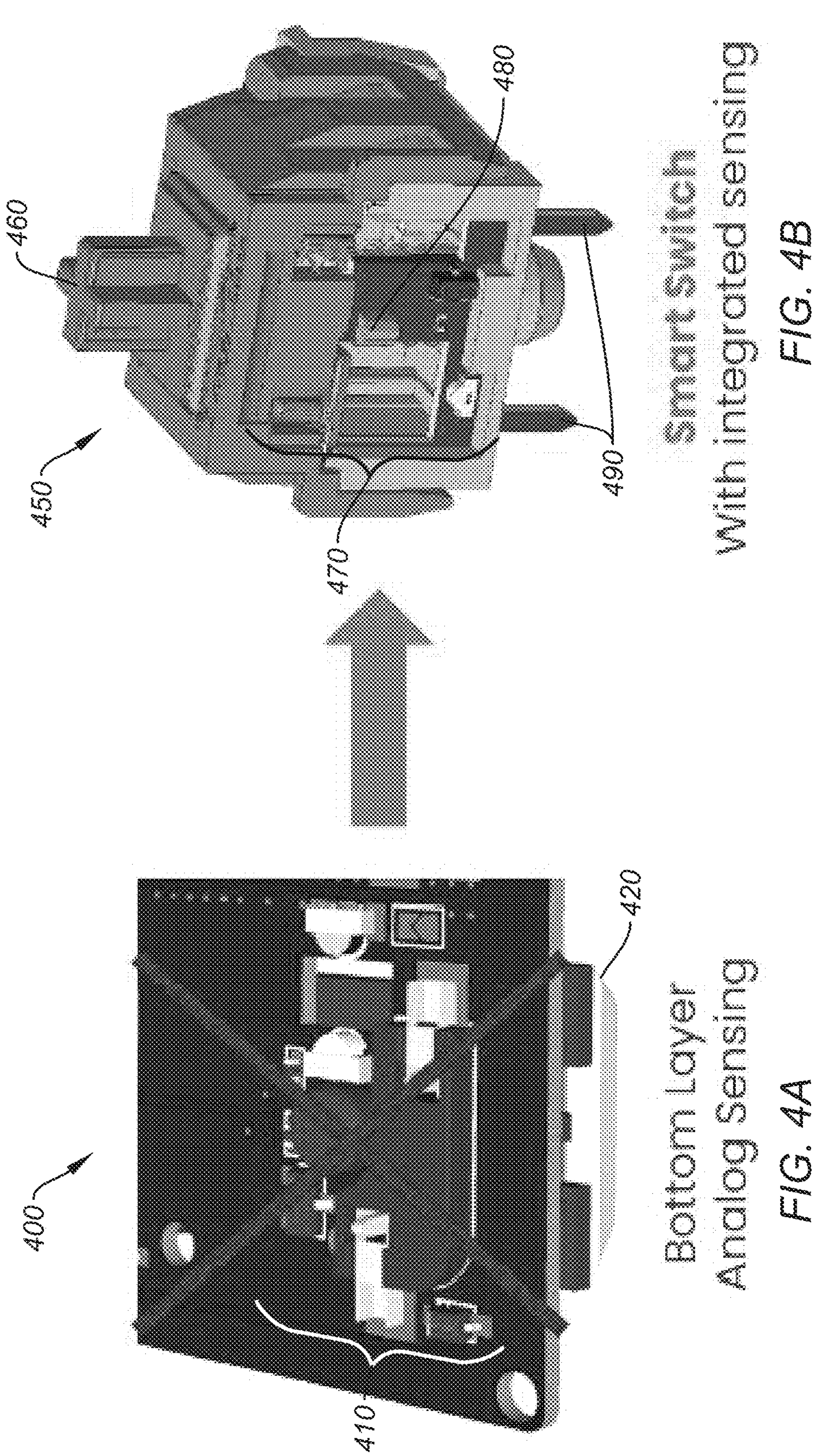
FIG. 4A shows a bottom side of a conventional printed circuit board (PCB) for a keyed device with key swapping capability.
FIG. 4B shows a smart keyswitch with fully integrated analog sensing, according to certain embodiments.

FIG. 4A shows a bottom side of a conventional printed circuit board (PCB) 400 for a keyed device. PCB 400 includes analog sensing circuit 410 on a bottom side of PCB 400 and a keyswitch 420 coupled to a top side of PCB 400. PCB 400 is conventional in design as it includes some or all of the analog sensing circuitry on the PCB itself. For instance, it may include an infra-red (IR) emitter and photodetector, where the IR emitter may direct light off of a reflective surface coupled to the keyswitch plunger, or through a path that may be blocked by a shutter coupled to the keyswitch plunger. In such embodiments, the keyboard is limited to one particular sensing technology due to sensing technology being integrated and hardwired to the PCB 400.

FIG. 4B shows a smart keyswitch 450 with fully integrated analog sensing, according to certain embodiments. Smart keyswitch 450 can include a plunger 460, analog sensing circuitry 470, galvanic contact 480, and input/output (I/O) pins 490. Analog sensing circuitry 470 is fully integrated within keyswitch 450 and enables replacement with smart keyswitches having a different sensing technology (e.g., inductive vs. optical) because there are no compatibility issues with any sensing technology already hardwired to the corresponding main PCB, as further described at least with respect to FIGS. 6B and 7. Thus, a smart keyswitch with inductive analog sensing fully integrated with the smart keyswitch can replace another smart keyswitch with optical analog sensing, or other suitable analog sensing technology, and can be done in a modular fashion when coupled to a universal smart keyswitch adaptor, as further described below at least with respect to FIG. 11B. Some embodiments can also switch out the analog sensing technology and target in a particular smart keyswitch in a modular fashion by replacing an internal PCB (further described below) that the analog sensing circuity is integrated on, and the target by replacing the plunger, without having to replace the entire key body (housing) of the smart keyswitch. Smart keyswitches can save power and significantly reduce cost and material waste. For instance, on conventional keyboards, every dedicated analog sensor circuit configured under each keyswitch may not be used. In keyboards with 100+ keys, the amount of circuitry and associated power requirements can be significant. Smart keyswitches, in contrast, have fully self-contained analog sensing, such that users can utilize smart keyswitches only on keys that they want analog functionality (e.g., WASD keys). In addition, to the above benefits, adding logic on the keyswitches themself can allow a much faster scanning rate, as further described below with respect to digital smart switches.

Figure 5B:
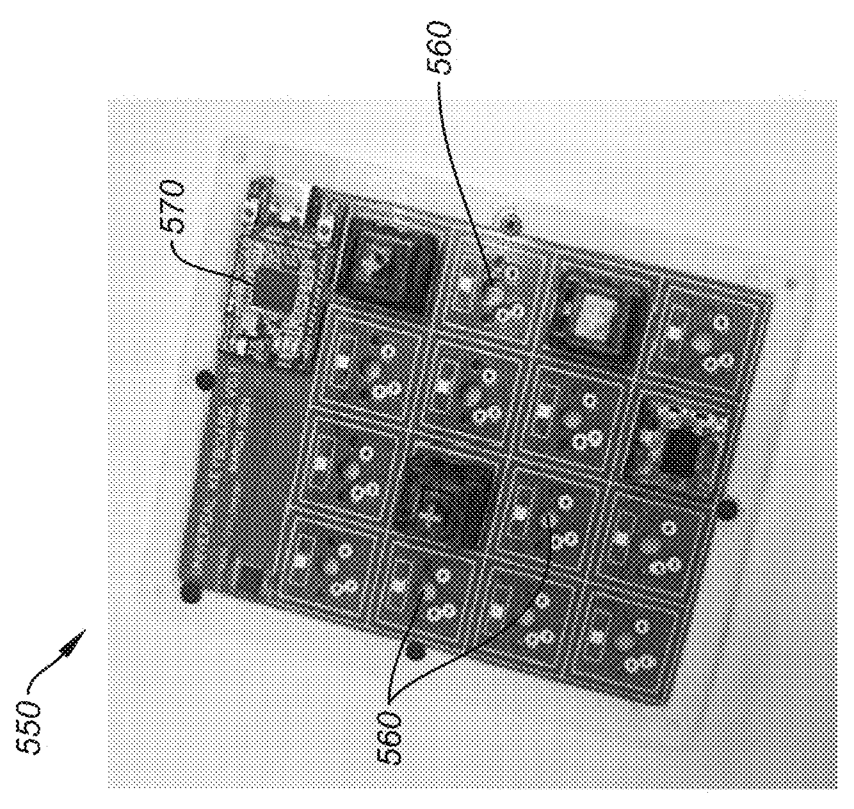
FIG. 5B shows a universal hot-swappable PCB configured to receive standard or smart keyswitches with no analog sensor circuitry configured thereon, according to certain embodiments.
Figure 5B:
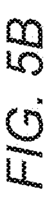
Figure 5A:
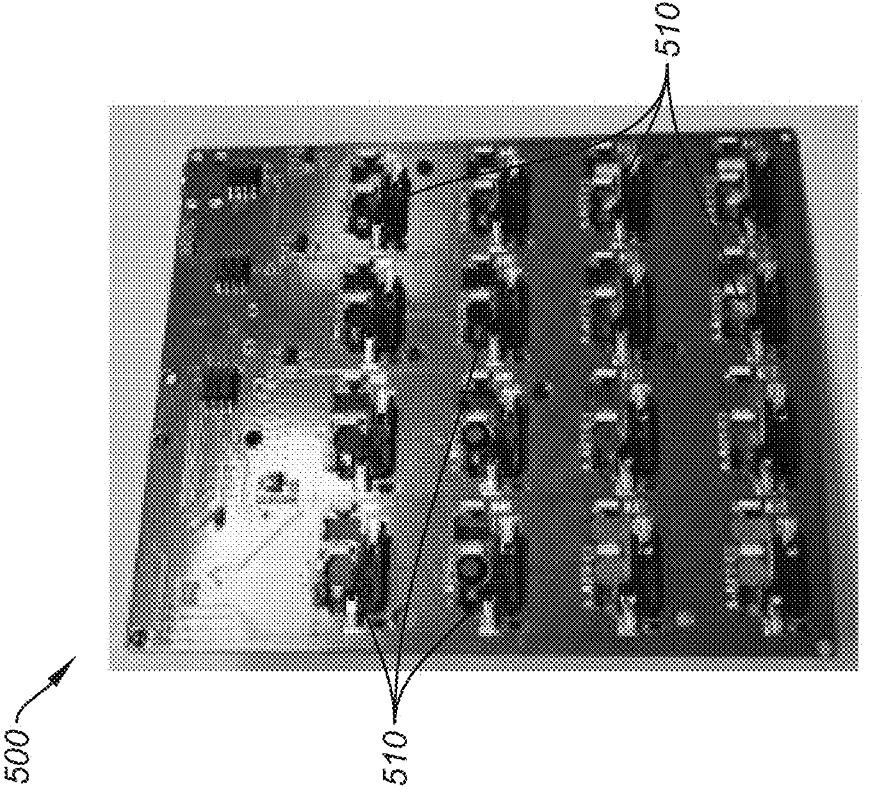
FIG. 5A shows a conventional hot-swappable PCB with analog sensor circuitry configured at each keyswitch mounting location.

FIG. 5A shows a conventional PCB 500 with analog sensor circuitry 510 configured and integrated at each keyswitch mounting location on the main PCB. FIG. 5B shows a universal PCB 550 configured to receive standard or smart keyswitches with no analog sensor circuitry configured thereon, according to certain embodiments. Universal PCB 550 includes universal socket installation locations 560, each configured to receive a universal smart keyswitch adaptor to modularly install/remove smart keyswitches (see, e.g., FIG. 11B) and a controller 570 configured to facilitate drive and sense lines to detect key presses by any of the keyswitches on the keyed device. The universal PCB 550 can accommodate both smart keyswitches utilizing a 3-pin architecture, as described herein, and conventional mechanical (e.g., galvanic) keyswitches utilizing a standard 2-pin architecture, as further described below. In some implementations, some sockets can have more than three pins, however such embodiments may not be cost effective, nor optimized.

Figures 6A, 6B:
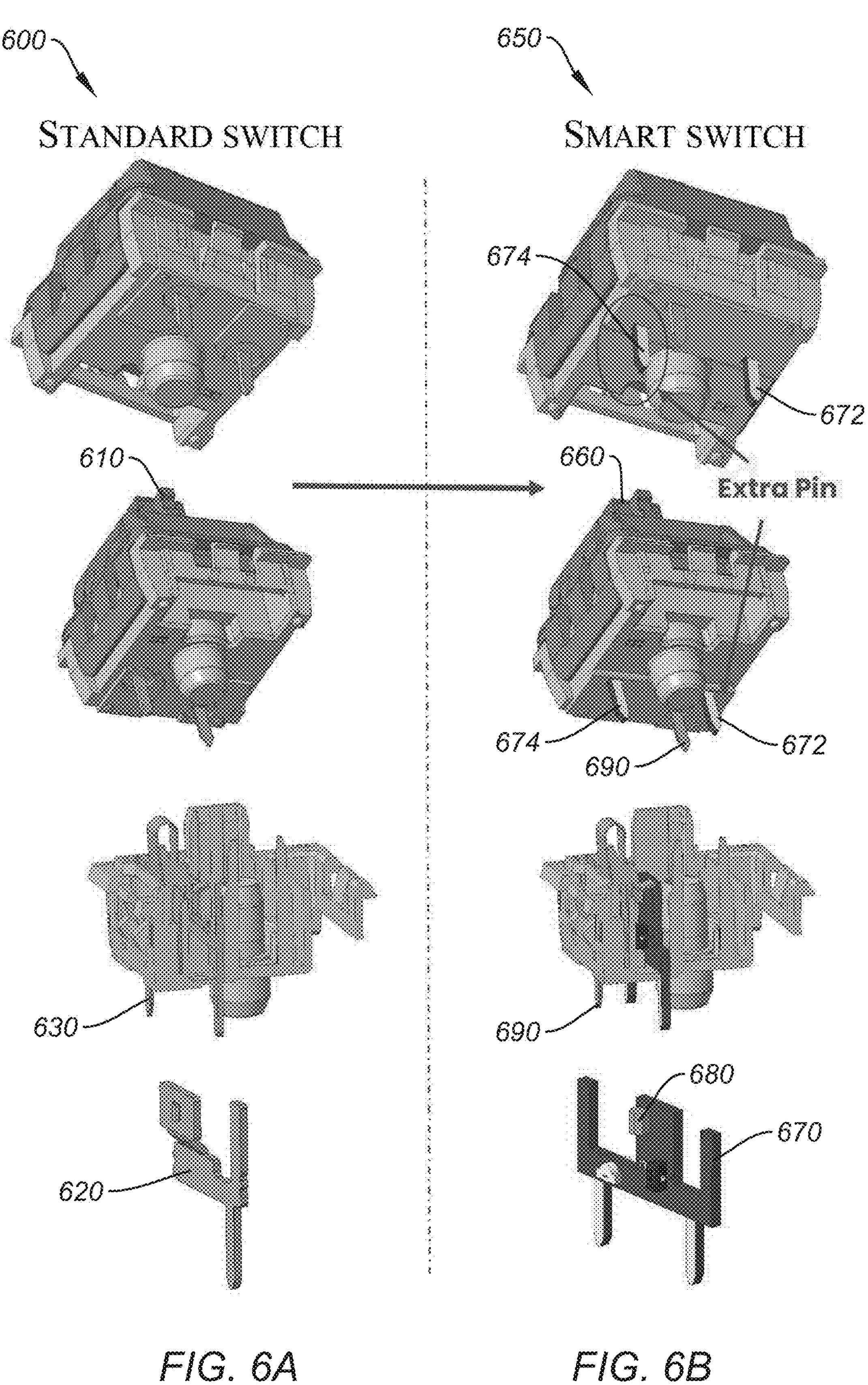
FIG. 6A shows a progressive cutaway view of a standard 2-pin galvanic key switch.
FIG. 6B shows a progressive cutaway view of a 3-pin smart keyswitch with fully integrated analog sensing, according to certain embodiments.

FIG. 6A shows a progressive cutaway view of a 2-pin, standard mechanical-type keyswitch 600. Keyswitch 600 includes a plunger 610, an insert with a first mechanical (e.g., galvanic) contact 620 with a first I/O pin, and a second mechanical (e.g., galvanic) contact 630 with a second I/O pin. The first mechanical contact 620 can include a protrusion that the second mechanical contact 630 touches when plunger 610 is depressed. The protrusion may provide a resistance to the second mechanical contact 630 as plunger 610 is depressed resulting in a keypress feedback profile (e.g., tactile, clicky, linear, etc.) based on the shape of the protrusion and the interaction between the first and second mechanical contacts. The first or second I/O pin may be coupled to a driver such that when the plunger is depressed and the first and second mechanical contacts make contact, an electrical circuit is completed, which can be detected and interpreted as a keypress event. Keyswitch 600 can include a conventional 2-pin layout, where the first and second I/O pins are oriented to accommodate standard galvanic keyswitches, as would be appreciated by one of ordinary skill in the art.

FIG. 6B shows a progressive cutaway view of a smart keyswitch 650 with fully integrated analog sensing, according to certain embodiments. Smart keyswitch 650 includes plunger 660, PCB 670 with a first bifurcated I/O pin 672 and a second bifurcated I/O pin 674, mechanical contact 680 coupled to PCB 670, and galvanic I/O pin 690. Smart keyswitch 650 has three I/O pins with two of the I/O pins (672, 674) configured in the same orientation as the standard 2-pin layout of keyswitch 600. PCB 670 integrates the analog sensing circuitry (e.g., IR emitter and phototransistor, inductive coil, etc.). Plunger 660 can include a target (directly or indirectly coupled thereto) that is sensed by the analog sensing circuitry of PCB 670, which may include a reflector or shutter for optical sensing, a conductor for inductive sensing, a magnet for magnetic sensing, or the like, as further described below at least with respect to FIG. 8. First bifurcated I/O pin 672 is a multipurpose I/O that can be used for analog or digital data transfer (e.g., input signal), for driving the galvanic circuit (e.g., contact-based key press detection), and for key identification, as further described below with respect to FIG. 10. I/O pin 672 is bifurcated, where two conductive traces are electrically isolated from each other. Second bifurcated I/O pin 674 is also a multipurpose I/O that can be used for analog or digital data transfer (e.g., output signal) and for power routing (e.g., VCC). PCB 670 can include galvanic contact 680, which can provide both provide a haptic feedback (e.g., clicky, tactile, linear, etc., feedback profile) and a conduction path for the galvanic keypress detection via pins I/O pin 674 and galvanic contact 690. In some embodiments, PCB 670 can be modular and non-destructively removeable so that a user can change, for instance, an upgraded or different type of analog sensing technology my simply swapping out PCB 670 with another. In cases where the sensing technology is changed (e.g., optical IR/PT to Hall Sensor), plunger 660 may need to be changed to include an appropriate target (e.g., shutter to magnet) that matches the new sensing technology. This can add value from a manufacturing standpoint as only the plunger and the PCB potentially have to be changed between switch versions. The bottom and top case of the switch can thus be produced at very high quantity and lower cost.

Figure 7:
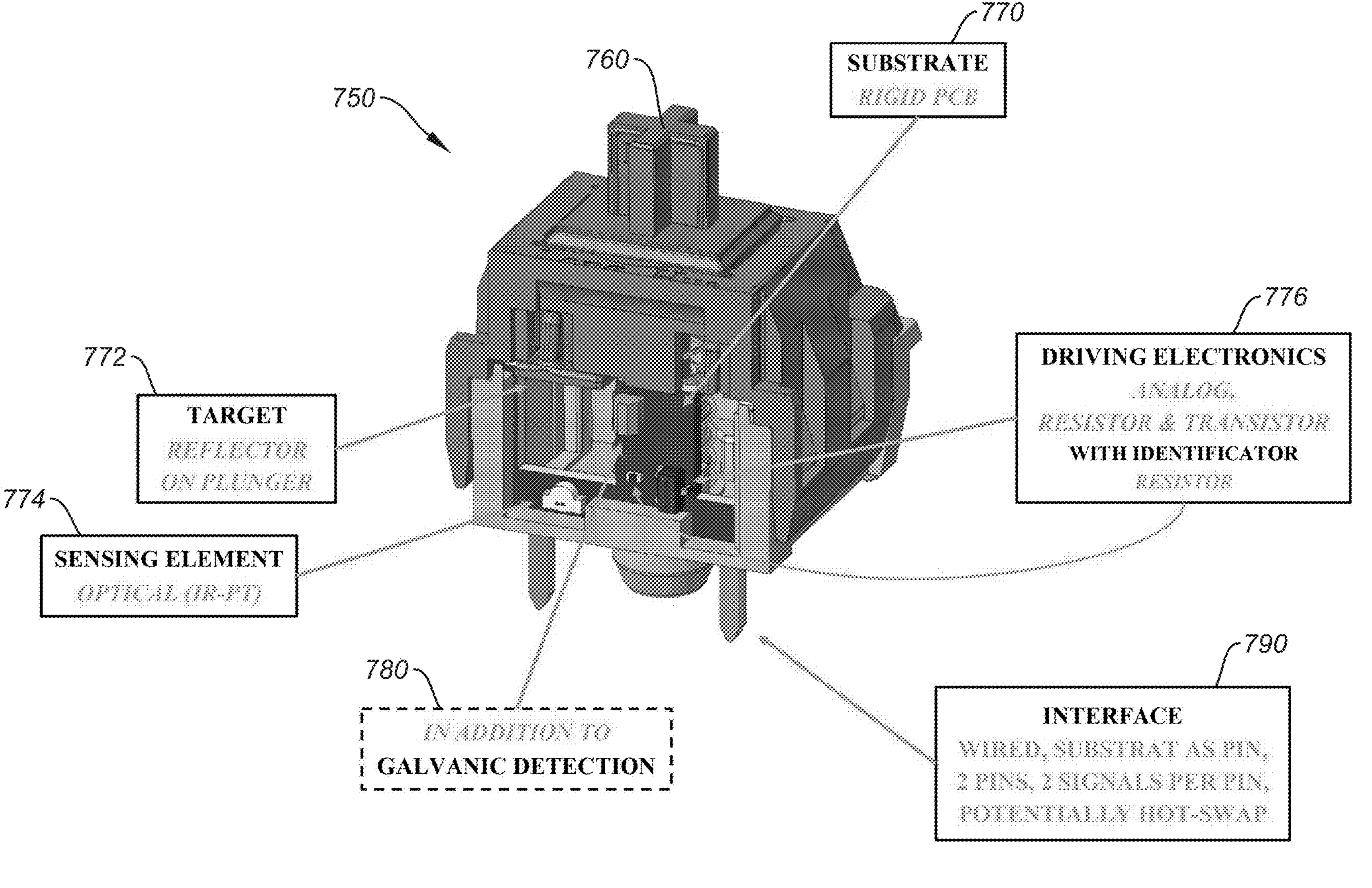
FIG. 7 shows a smart keyswitch with integrated analog sensing, according to certain embodiments.

FIG. 7 shows a smart keyswitch 750 with integrated analog sensing, according to certain embodiments. Keyswitch 750 includes a plunger 760, a substrate (e.g., PCB) 770, a target 772 coupled directly or indirectly to plunger 760, analog sensing element(s) 774 integrated with substrate 770, galvanic contact 780, interface pins 790 (e.g., three I/O pins) that include two bifurcated pins that enable two signals per pin and support a total of five signals over the three I/O pins (e.g., GND, input, output, VCC, and galvanic pin), and driving electronics 776 integrated with substrate 770 that can drive analog sensing, and facilitate keyswitch identification. Identification can be important as all the keyswitches have the same interface pins, and the system needs to know what kind of keyswitch it is to correctly communicate with the onboard sensing technology. Keyswitch 750 may be the same or similar to the keyswitches shown in FIGS. 4B, 6B, and 8-10 (e.g., similar architecture with the same or different analog sensing circuitry on the substrate 770). Target 772 can be any suitable target type that corresponds to the analog sensing circuitry of sensing element(s) 774. For example, for optical sensing, target 772 may be a reflector or shutter coupled to plunger 770. For inductive sensing, target 772 may be a conductive element coupled to plunger 770. Other examples are further presented below with respect to FIG. 8A. Some embodiments of keyswitch 750 may include contact-based detection via galvanic contact 780 in addition to analog sensing, or exclude contact-based detection and only incorporate analog sensing (e.g., substrate 770 may include or exclude galvanic contact 780).

Figure 8A:
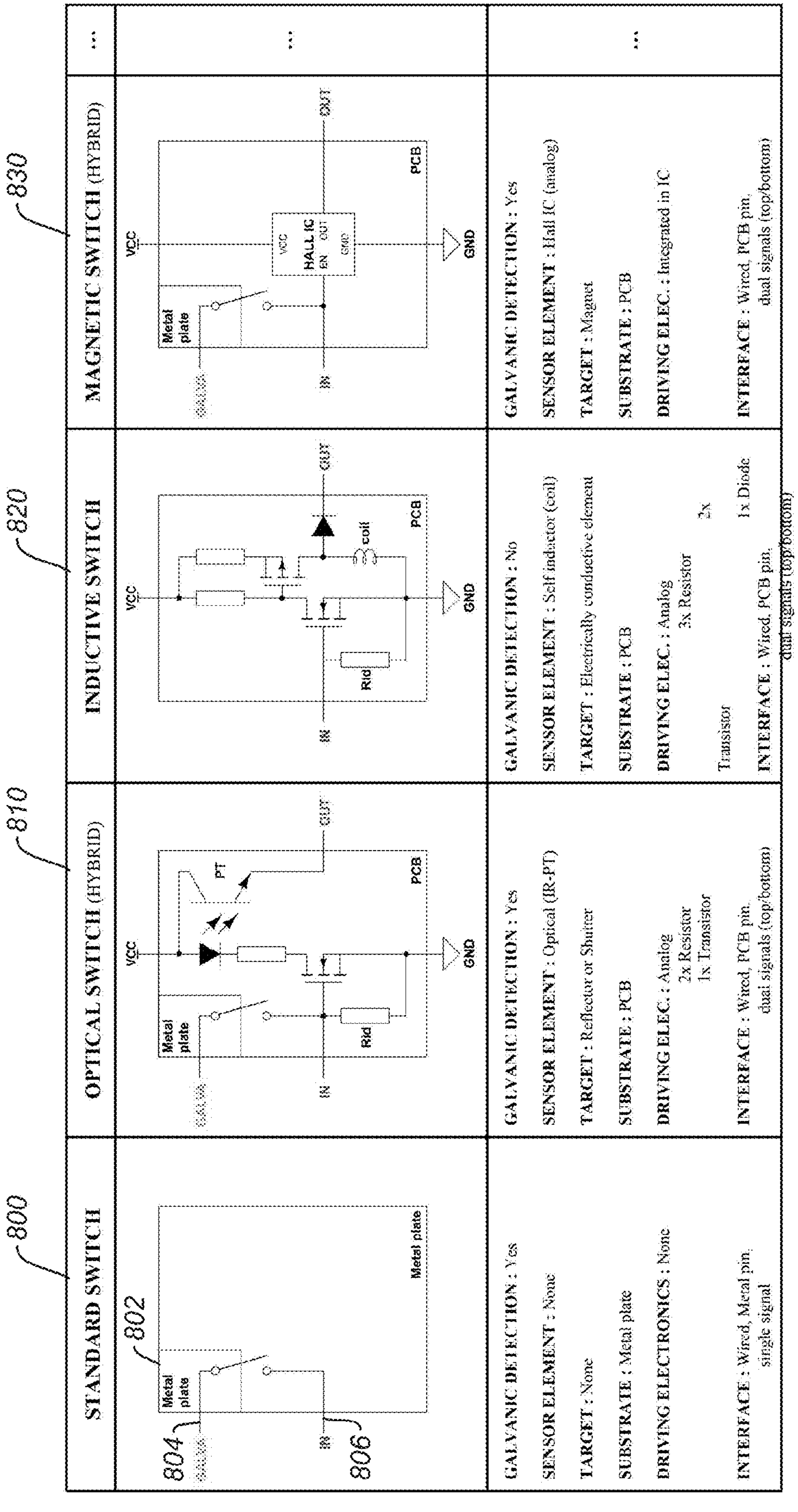
FIG. 8A shows simplified circuit diagrams for various analog sensing circuits for smart keyswitches, according to certain embodiments.

FIG. 8A shows simplified circuit diagrams for various analog sensing circuits for smart keyswitches, according to certain embodiments. The non-limiting analog sensing circuits described in FIG. 8A include standard switch contact-based detection 800, optical sensing 810, inductive sensing 820, and magnetic switch sensing 830, although other types are possible.

Standard switch contact-based detection 800 can include galvanic detection via a metal plate coupled to a first contact 804 ("Galva" pin on metal plate 802). As the plunger is depressed, a second contact 806 ("IN" pin) makes mechanical and electrical contact with first contact 804, thereby instantiating a contact-based key press, as would be appreciated by one of ordinary skill in the art with the benefit of this disclosure. This circuit can be incorporated into smart keyswitches in addition to analog sensing circuits in hybrid keyswitch architectures.

Optical switch 810 can be a hybrid keyswitch with both galvanic and optical analog sensing, according to certain embodiments. Optical sensing may be enabled via one or more light emitting elements (e.g., infra-red light emitting diode ("IR LED") and one or more light detection elements (e.g., photodetector, phototransistor). A target can be coupled to a plunger and may include a reflector (e.g., reflects light from the IR LED toward the photodetector) or shutter (e.g., blocks light from the IR LED from reaching the photodetector). The position of the plunger and corresponding target can affect the amount of light that reaches the light detection element, which can correlate to a measured analog position of the plunger, as would be appreciated by one of ordinary skill in the art with the benefit of this disclosure. The analog sensing circuitry, driving electronics, and galvanic contact can be mounted on a substrate (e.g., PCB 770) that is fully contained within the hybrid keyswitch, as described above with respect to FIG. 7. Driving electronics for analog sensing can include resistors, transistors, diodes, or other discrete or integrated components, as would be appreciated by one of ordinary skill in the art with the benefit of this disclosure.

Inductive switch 820 can be an analog-only keyswitch, or a hybrid keyswitch with both galvanic and inductive analog sensing, according to certain embodiments. Inductive sensing may be enabled via one or more self-inductors (e.g., coil). A target can be coupled to a plunger and may include an electrically conductive element. The position of the plunger and corresponding target can affect the amount of electrical eddy current generated by the coil, which can correlate to a measured analog position of the plunger, as would be appreciated by one of ordinary skill in the art with the benefit of this disclosure. The analog sensing circuitry, driving electronics, and galvanic contact can be mounted on a substrate (e.g., PCB 770) that is fully contained within the hybrid keyswitch, as described above with respect to FIG. 7. Driving electronics for analog sensing can include resistors, transistors, diodes, or other discrete or integrated components, as would be appreciated by one of ordinary skill in the art with the benefit of this disclosure.

Magnetic switch 830 can be an analog-only keyswitch, or a hybrid keyswitch with both galvanic and magnetic sensing, according to certain embodiments. Magnetic sensing may be enabled via a Hall sensor. A target can be coupled to a plunger and may include a magnetic element. The position of the plunger and corresponding target can affect the amount of magnetic field detected by the Hall sensor, which can correlate to a measured analog position of the plunger, as would be appreciated by one of ordinary skill in the art with the benefit of this disclosure. The analog sensing circuitry (e.g., Hall sensor in an integrated circuit (IC) package), driving electronics, and galvanic contact can be mounted on a substrate (e.g., PCB 770) that is fully contained within the hybrid keyswitch, as described above with respect to FIG. 7. Driving electronics for analog sensing can include resistors, transistors, diodes, or other discrete or integrated components, as would be appreciated by one of ordinary skill in the art with the benefit of this disclosure.

Figure 8C:
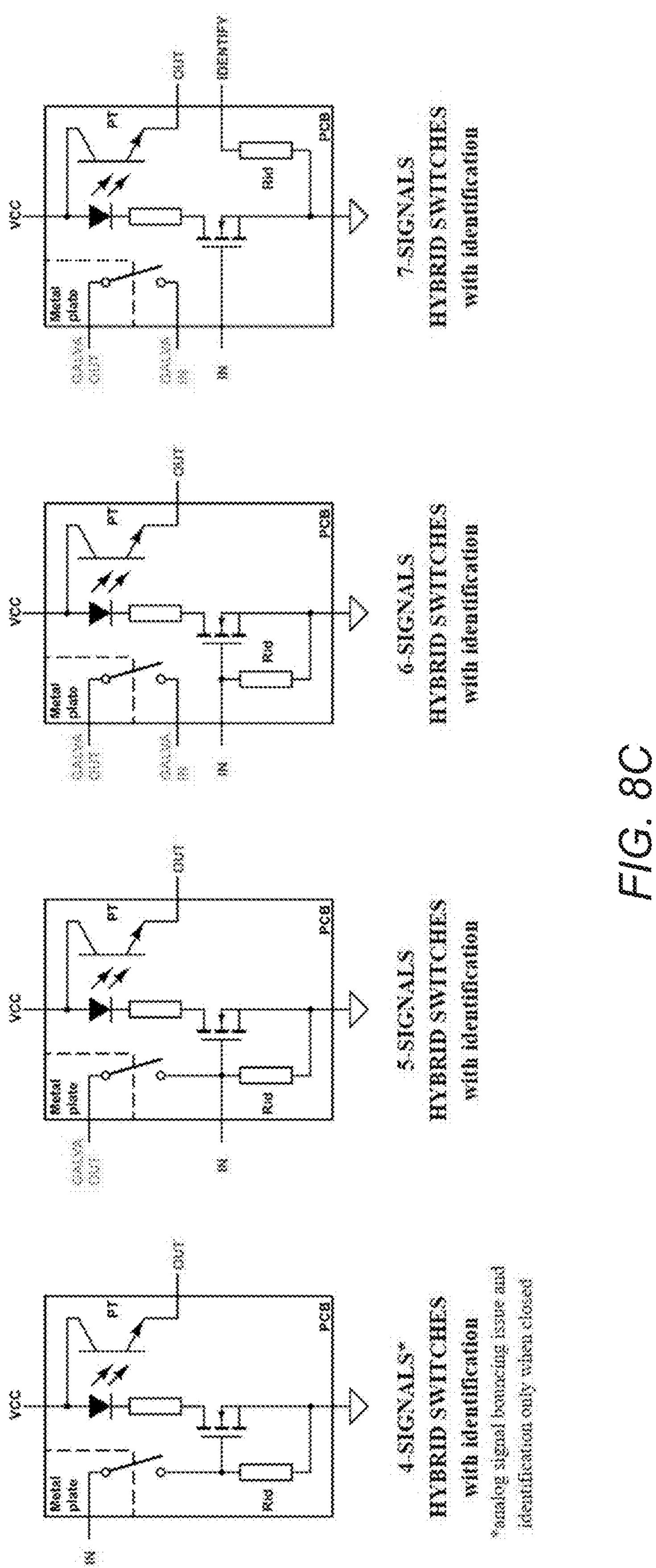
FIG. 8C shows simplified circuit diagrams for various analog sensing circuits for smart keyswitches, according to certain embodiments.

Other methods of analog sensing can be used instead of or in conjunction with the various analog sensing schemas described above. For example, serial keyswitches, daisy chain keyswitches, radio frequency (RF) keyswitches, and wireless keyswitches can be used, among other technologies, as shown in FIGS. 8B-8C. With serial keyswitches, for example, galvanic detection can be incorporated with mutual capacitance-based sensing element(s), both of which can be integrated on a substrate (e.g., PCB 770) with a digital sensor IC (e.g., ASIC) for driving electronics, for instance. A corresponding dielectric element can be configured as a target. With daisy chain keyswitches, for example, galvanic detection can be incorporated with time-of-flight (TOF) laser sensing element(s), both of which can be integrated on a substrate (e.g., PCB 770) with a digital sensor IC (e.g., ASIC) for driving electronics, for instance. A corresponding reflector can be configured as a target. With RF keyswitches, for example, galvanic detection can be incorporated with optical IR-PT sensing element(s), both of which can be integrated on a substrate (e.g., PCB 770) with a digital sensor IC (e.g., ASIC) for driving electronics, for instance. A corresponding reflector or shutter can be configured as a target. With wireless keyswitches, like RF for example, galvanic detection can be incorporated with TMR sensing element(s), both of which can be integrated on a substrate (e.g., PCB 770) with a digital sensor IC (e.g., ASIC) for driving electronics, for instance. In some cases, a corresponding plastic (IME) can be used as a substrate to hold the electronics and sensor. One of ordinary skill in the art with the benefit of this disclosure would appreciate the many modifications, variations, and alternative embodiments thereof.

It should be noted that although many of the novel designs described herein are configured in a way to keep the pin count low to have a simple interface (e.g., socket) to connect the keyswitch on the keyboard. Some non-ideal designs may incorporate four signal switches (e.g., VCC, GND, IN, OUT) for identification, galvanic read, and motion sensor read, for instance. However, four signal versions may have less ideal performance issues. For instance, the motion sensor may only be driven when the keyswitch is closed (e.g., if the galvanic fails, the system fails), the motion sensing signal can be subject to the bouncing of the galvanic contact, and the identification will only work if the switch is closed. Thus, a five signal keyswitch can have function benefits where the galvanic channel (e.g., GALV OUT pin) is separated from the motion sensor channel (e.g., IN pin), meaning both can be read individually, and the identification is still linked with the IN pin. In some embodiments, switches can have more pins that would make the driving easier (e.g., each feature has its pin), but can significantly increase the complexity in terms of sockets/pin connections and size and in terms of PCB tracing. The novelty described herein of having signals or I/Os that have multiple functions on a keyswitch is advantageous not only at the switch level (e.g., where IN is used for galvanic drive, motion sensor drive, and identification), but also at the keyboard level where the rows I/Os are used for both the galvanic read and power control of the switches.

Figure 9:
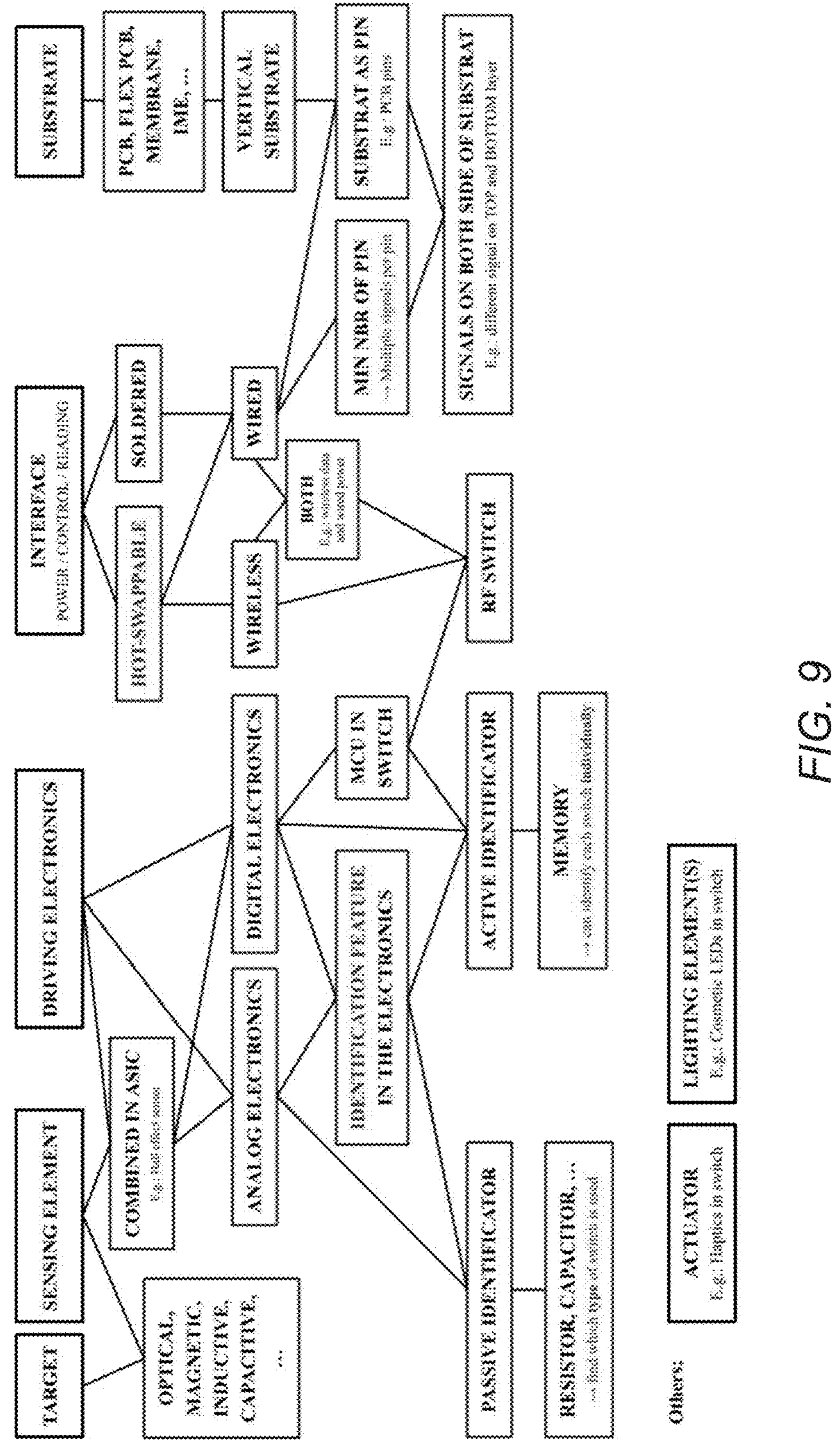
FIG. 9 shows a simplified block diagram that presents a number of design options for smart keyswitch structures, according to certain embodiments.

FIG. 9 shows a simplified block diagram 900 that presents a number of design options for smart keyswitch structures, according to certain embodiments. At a high level, block diagram 900 illustrates a number of design options in a smart keyswitch design that include at least one mechanical keyboard keyswitch with an embedded sensing element configured to sense the displacement of a target coupled to the plunger, in addition to or instead of, galvanic contact based detection where all of the specific driving electronics for the sensing element configured to generate an analog or digital signal containing the plunger displacement information is also embedded on a substrate inside of the switch body. The driving electronics and the sensing element can be interfaced (e.g., powered, controlled, read) by the keyboard main circuitry.

Figure 10:
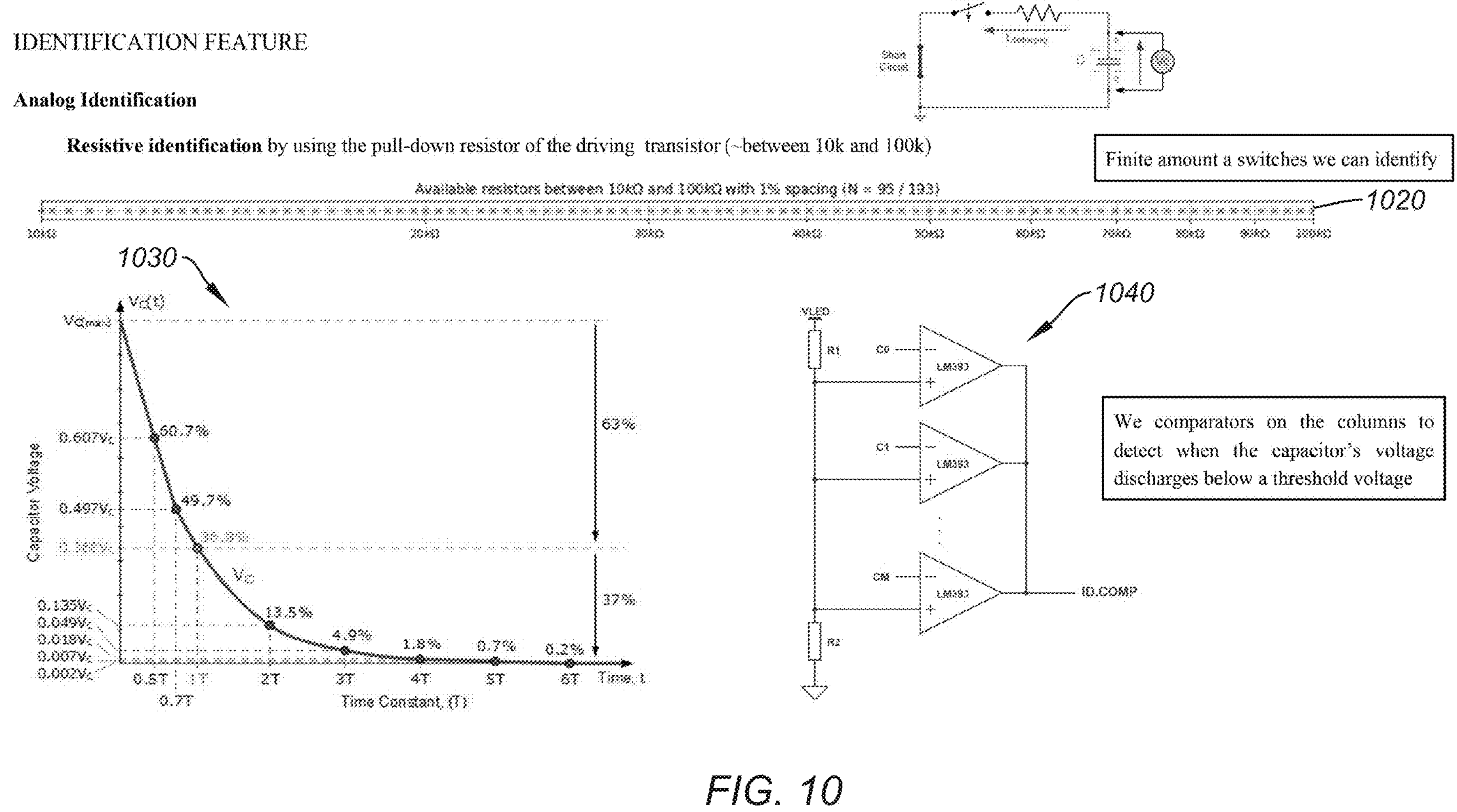
FIG. 10 shows identification features of a smart keyswitch, according to certain embodiments.

FIG. 10 shows identification features of a smart keyswitch, according to certain embodiments. Circuit 1010 includes a switch, a resistor R (or network thereof), a capacitor C (or network thereof) where R can vary (e.g., 10K-100K ohms). Circuit 1010 can be used to identify a particular keyswitch based on a discharge time constant that is controlled by the value of R and C. Varying R between 10K and 100K ohms in small increments (2-5K ohms) will change the discharge time constant enough to measure a difference between keyswitches, as shown in plot 1030. In some embodiments, a comparator network 1040 can be used on groups of keyswitches (e.g., grouped in columns, rows, or other suitable grouping) to determine when a voltage across the capacitor discharges below a threshold voltage. This discharge time can be used to identify the correct keyswitch that is activated (e.g., generating an analog output) during a key press event. In some embodiments, a resistance divider inside the smart switch can be sued, as it can make identification fairly easy using an analog-to-digital converter (ADC) on the main processor. However, the number of ADCs and overall analog inputs is often tempered with the goal of having cost effective KBD architectures. In some cases, digital identification can be used via an ASIC or MCU configured inside the keyswitch, where there is a memory to store the switch information. This exchange of information between the switch and the MCU could be encrypted and used to authenticate the switches.

Figures 11A, 11B:
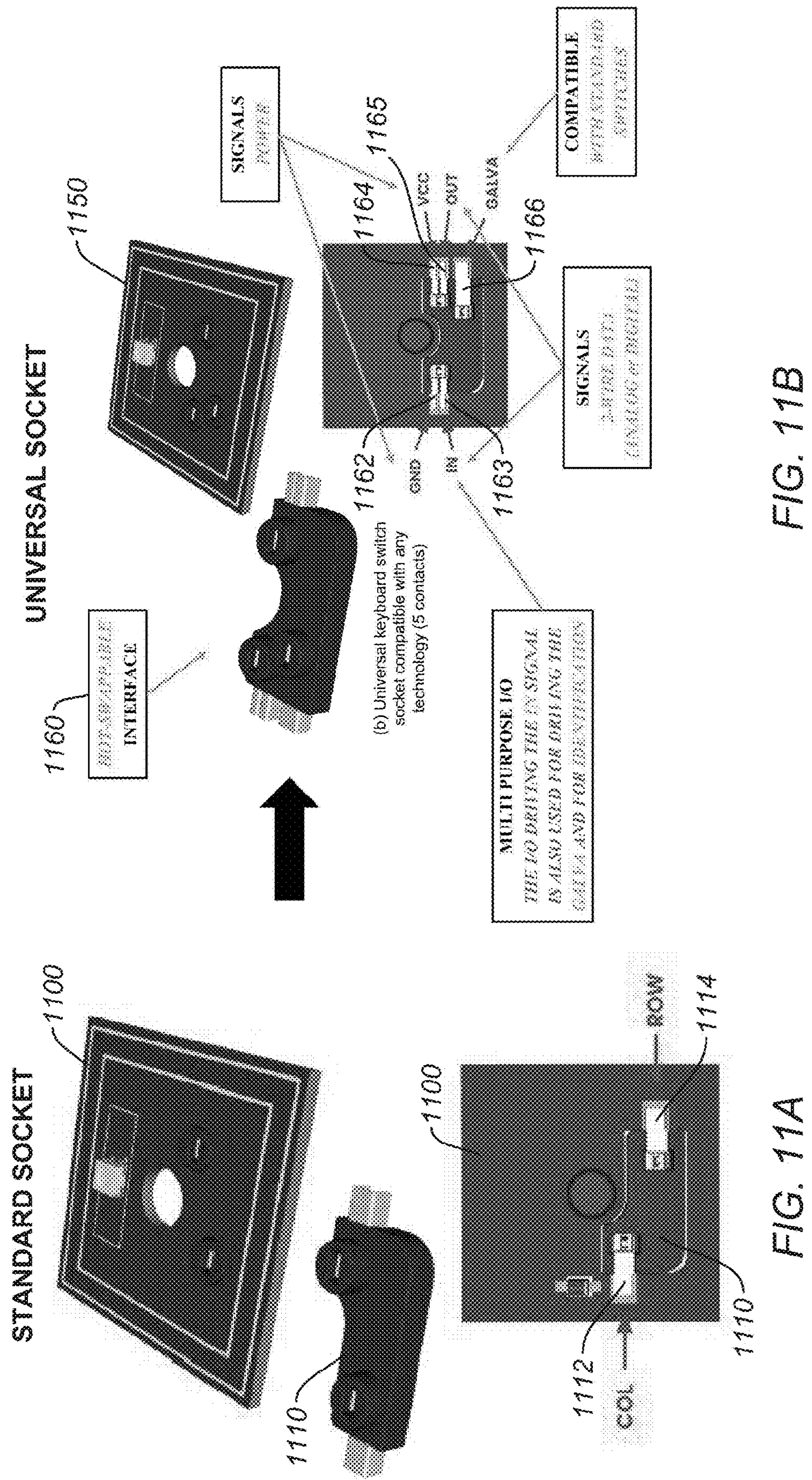
FIG. 11A shows a standard socket and corresponding PCB for conventional designs.
FIG. 11B shows a universal socket and corresponding PCB for smart keyswitches, according to certain embodiments.

FIG. 11A shows a standard socket 1110 and corresponding PCB 1100 for conventional designs. Socket 1110 mounts onto a keyboard PCB 1100, as shown, and includes a two pin interface in a conventional orientation and configuration, including a column (col) pin 1112 and a row pin 1114. Socket 1110 can accommodate a standard two-pin galvanic keyswitch for contact-based, galvanic sensing, as also shown in FIG. 4A.

FIG. 11B shows a universal socket 1160 and corresponding main keyboard PCB 1150 (or one of a plurality of local keyboard PCBs) for smart keyswitches, according to certain embodiments. Universal socket 1160 can be configured to couple to PCB 1150 in the manner shown in FIG. 11B. Universal socket 1160 can be a hot-swappable interface and can include a pin layout that is compatible with a number of keyswitch technologies, including standard two-pin galvanic keyswitches (e.g., Cherry® keyswitches), smart keyswitches (as described in the present disclosure), or the like. Universal socket 1160 can include a first bifurcated I/O pin with two contacts 1162/1163, a second bifurcated I/O contact pin with two contacts 1164/1165, and a galvanic I/O pin 1166. First bifurcated I/O pin is a multipurpose I/O that can be used for analog or digital data transfer (e.g., input signal), for driving the galvanic circuit (e.g., contact-based key press detection), and for key identification. The first bifurcated I/O pin can be bifurcated, where two conductive traces (contacts 1162/1163) are electrically isolated from each other. In some embodiments, the first bifurcated I/O pin can be configured to receive (e.g., electrically couple to and secure) bifurcated pin 672 or pin 674 of the smart keyswitch of FIG. 6B. The second bifurcated I/O pin can be bifurcated, where two conductive traces (contacts 1164/1165) are electrically isolated from each other. In some embodiments, the second bifurcated I/O pin can be configured to receive (e.g., electrically couple to and secure) bifurcated pin 672 or pin 674 of the smart keyswitch of FIG. 6B.

In summary, universal socket 1160 has three I/O pins. When universal socket 1160 is coupled to a conventional 2-pin keyswitch (e.g., see FIG. 6A), the galvanic I/O pin 1166 and the combination of both contacts 1164/1165 (or 1162/1163) can operate as COL and ROW lines for drive and sense per conventional keyswitch operation. When universal socket 1160 is coupled to a 3-pin smart keyswitch, as described herein (see, e.g., FIGS. 6B-7), the first bifurcated contact, second bifurcated contact, and galvanic contact can be configured to operate as shown in FIG. 11B, by utilizing the additional contacts to interface with the smart keyswitch with signals including GND, IN (input) data, OUT (output) data, galvanic contact, and VCC. The input data line can be a multipurpose I/O that includes driving the IN signal, driving the galvanic pin, and for keyswitch identification. Some embodiments may employ additional pins and/or circuitry to facilitate any suitable functionality including wireless communication with each keyswitch. One of ordinary skill in the art with the benefit of this disclosure would appreciate the many modifications, variations, and alternative embodiments thereof.

Figure 12:
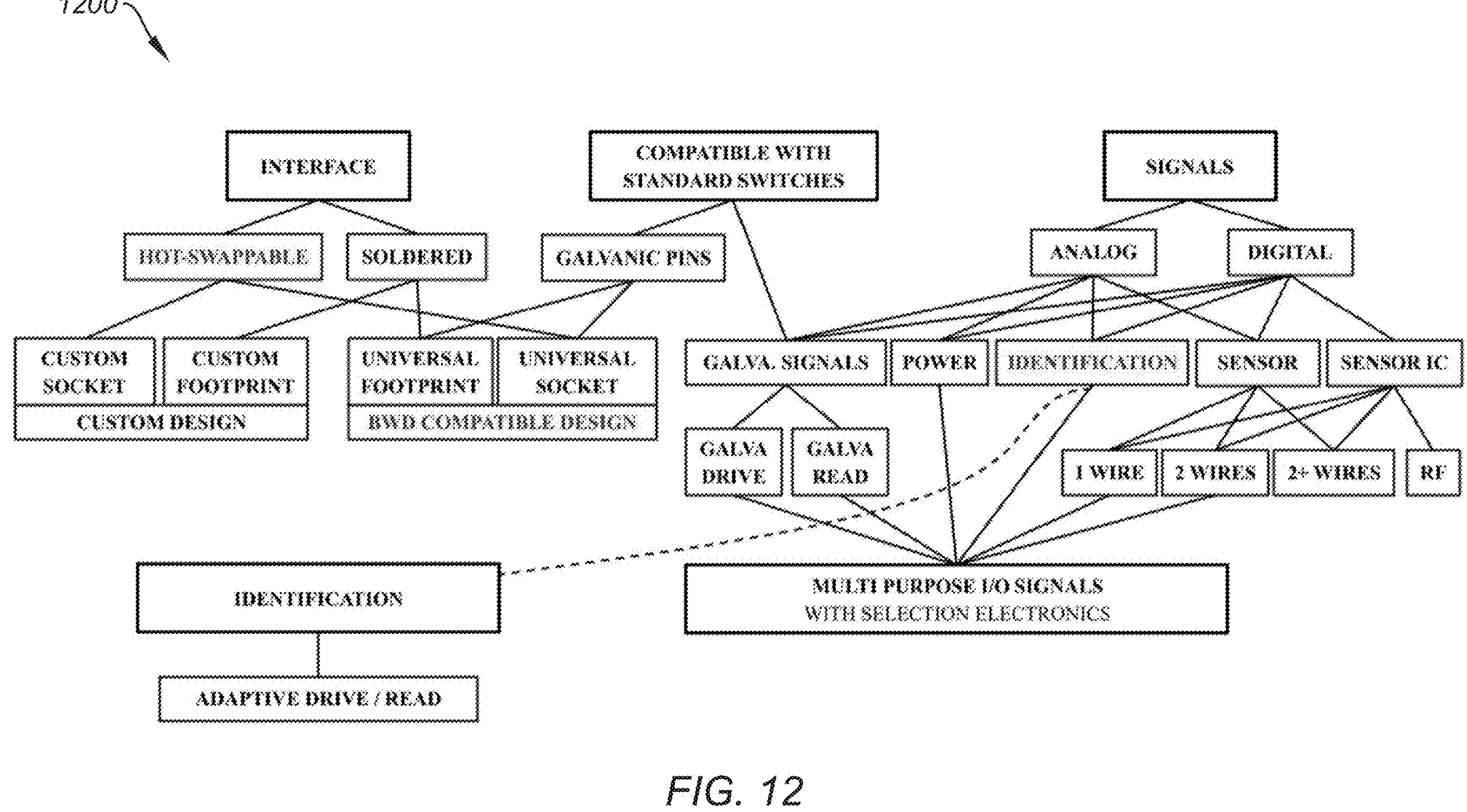
FIG. 12 shows a simplified block diagram for a universal socket, according to certain embodiments.

FIG. 12 shows a simplified block diagram 1200 for a universal adaptor (e.g., socket), according to certain embodiments. At a high level, block diagram 1200 illustrates a number of design options in a universal keyswitch adaptor design that includes aspects of a mechanical keyboard platform, where the keyswitches can be mounted on a universal interface allowing any keyswitch sensing technology (e.g., galvanic, optical, magnetic, inductive, capacitive) to be used at any location on the keyboard. In such cases, no sensing technology is mounted on the keyboard main PCB itself under the key switches. The universal adaptor and main keyboard PCB can drive and read the information of the plunger position of each keyswitch (e.g., with two or more values for the position) that is being sensed from the inside of the key switch, as well as powering the switches when required, for any keyswitch sensing technology. The signals that are sent and/or received to/from the key switches can be either digital or analog, or a combination thereof.

Figure 13:
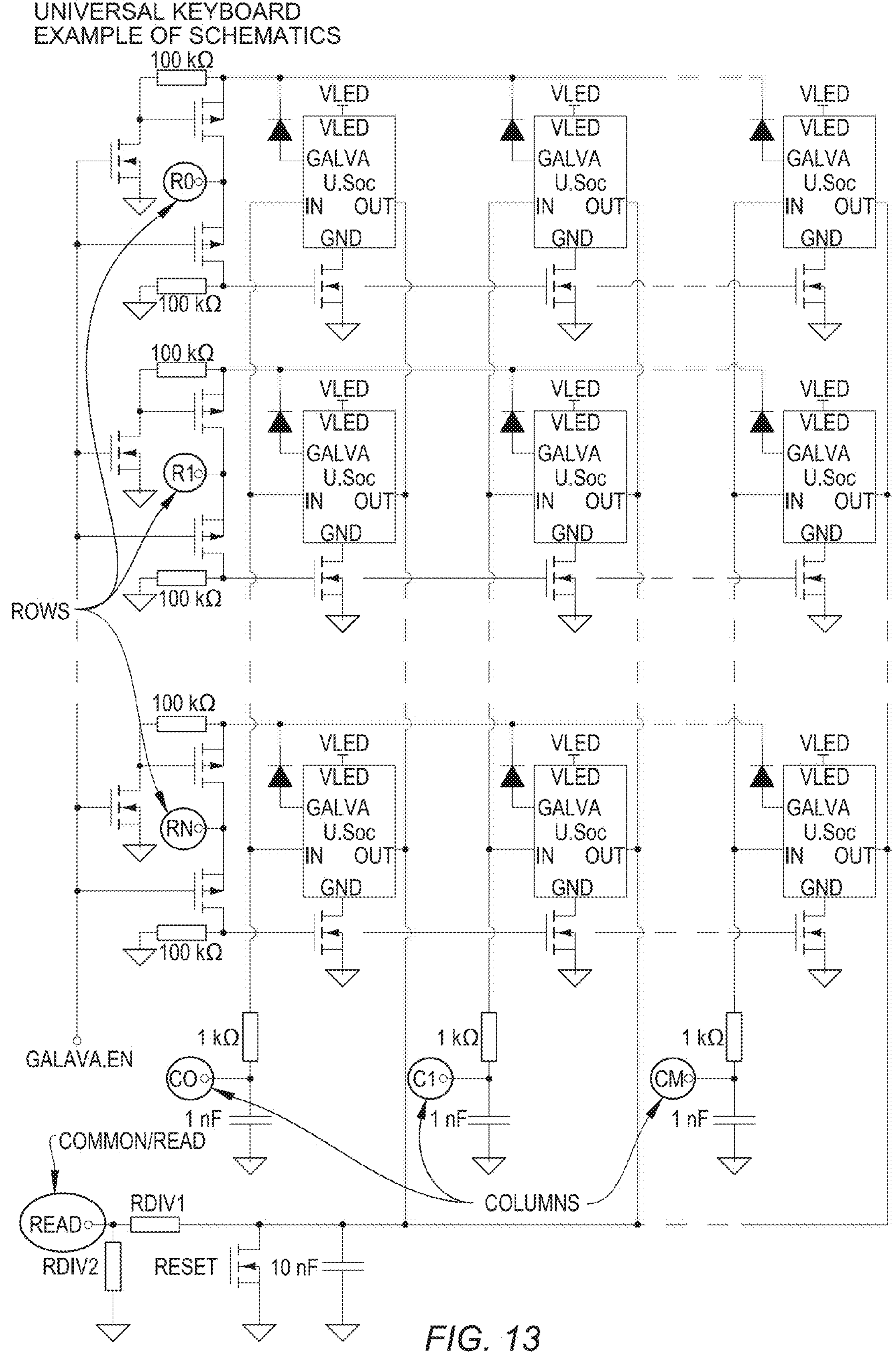
FIG. 13 shows a simplified circuit diagram for a universal keyboard, according to certain embodiments.

FIG. 13 shows a simplified circuit diagram 1300 for a universal keyboard, according to certain embodiments. Some of the main functions of the circuit diagram shown in FIG. 13 can be that it is based on a matrix implementation in order to individually access each smart switch with the minimal number of lines/signals. The rows can be powered individually through a "virtual ground" (e.g., using MOSFET for each switch, but controlled by row only), the column is selected directly through MCU GPIOs. The outputs of all smart switches can then be connected together. Another implementation could use Multiplexer, where the rows are scanned through the MUX, though this may require more time (e.g., MUX channel swaps) and increasing the system cost. Some implementations use a MOSFET for each switch, which can be on the main PCB. The Virtual GND MOSFET could also be located within the switch. In order to still be able to quickly read the galvanic switch status (e.g., for galvanic switch or hybrid switches), the rows implement an enable to allow the same pins being used for galvanic readying and switch addressing (through the Virtual ground explained above).

Figure 14:
FIG. 14 shows a graph plotting a dynamic scanning sampling rate for different scanning methods, according to certain embodiments.
Figure 14:
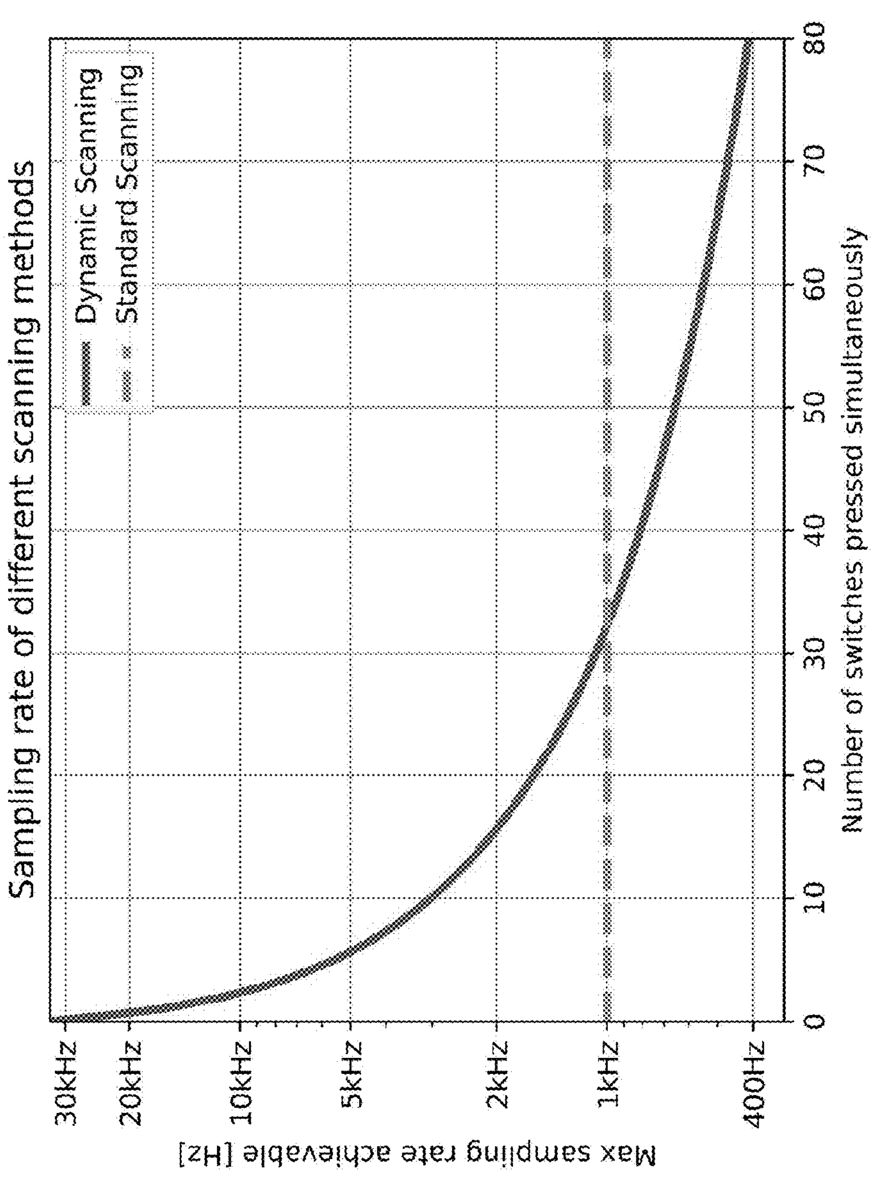

FIG. 14 shows a graph plotting a dynamic scanning sampling rate for different scanning methods, according to certain embodiments. A benefit of the smart switch is its capability to be individually addressed. The hardware (HW) feature allows the firmware (FW) to make a decision on which keyswitch to sample, and only when it is needed. The approach is based on three stages: (1) the galvanic matrix is scanned to understand which keys are being pressed; (2) only the keys that have been pressed are being sampled for their analog value or digital value. Typically, analog keyboards may need a very long scanning time due to the analog nature of the signals (which requires ADC) and the quantity of the switches that need to be scanned. The individual dynamic scanning approach allows for a very high report rate when only a limited number of switches are pressed. The means that if the number of key pressed at the same time is limited (e.g., <10), the smart switch dynamic scanning is significantly faster than typical implementation.

Figure 15:
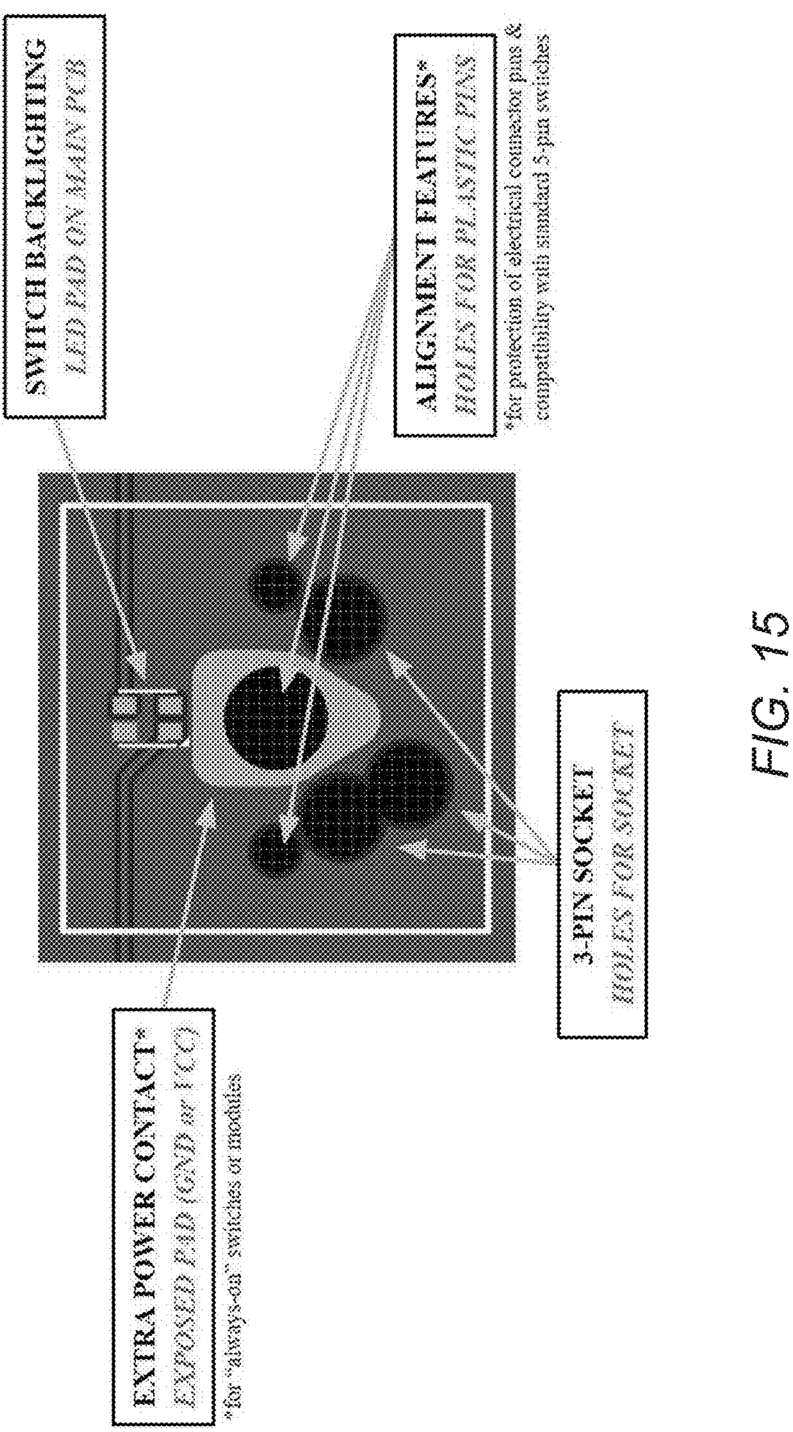
FIG. 15 shows a universal main PCB with an extra power contact, a 3-pin socket, a switch for backlighting, and alignments features, according to certain embodiments.

FIG. 15 shows a universal main PCB with an extra power contact, a 3-pin socket, a switch for backlighting, and alignments features, according to certain embodiments. The extra power contact can include an exposed pad (e.g., GND or VCC), which can be used for "always-on" switches or modules, for example. The 3-pin socket can include holes for the socket. The switch for backlighting can have an LED pad on the main PCB. Alignment features can be holes for plastic pins, for instance, and may be used for protection of electrical connector pins and for compatibility with standard 5-pin switches, for instance.

Further Alternative Embodiments

In some embodiments, the various smart switches described herein place the substrate (e.g., PCB) vertically inside the housing of the key structure. Alternatively, some embodiments may utilize a horizontally-oriented substrate configured beneath the key structure. In some aspects, the substrate can also stay separate beneath the switch but increase the thickness. Horizontally-oriented designs can be compatible with contemporary sensor designs, and various switch designs can be used including, but not limited to, analog switches with magnetic, optical, capacitive, inductive fields, or other as would be appreciated by one of ordinary skill in the art with the benefit of this disclosure. Some benefits of the module design are that the switch can avoid typical keyboard design problems like gasket tolerances and stacking tolerances. In some cases, metal pins can be stronger than PCB pins of the smart switch.

Summary of Certain Embodiments (1) SmartSwitch=Housing+Plunger+Motion sensor+substrate ("PCB in Switch")
- a) Motion Sensor
  - i. Digital/Analog sensing only
    - 1. Analog Output:
      - a. Magnetic (Hall, TMR, . . . ), Induct., Capac., Optical, Resistive
    - 2. Digital Output:
      - a. Magnetic (Hall, TMR, . . . ), Inductive, Capacitive, Optical
  - ii. Hybrid Implementation
    - 1. Galvanic contact built in the housing in addition to analog sensing
    - 2. Galvanic contact possible before or after the analog/digital sensing
      - a. Galvanic contact triggered as soon as the user starts to touch in order to start/wake-up the motion sensor on the full range of motion of the switch
    - 3. Galvanic contact could happen at the same time than the analog/digital sensing
      - b) Alternative Sensors
  - i. The smart switch could also include a force detection sensor
    - (1) Force sensing can be done at the bottom of the switch
    - (2) Force sensing can be done at the keycap level
- c) Substrate with electrical traces and capability to solder active components
  - (1) Switch includes one or more substrates (PCB)
  - (2) Substrate with motion sensor mounted vertical and/or horizontally
  - (3) Electronics
    - (1) With or without driving electronics in the switch
    - (2) With or without a processor in the switch (4) Motion+driving electronics could be a single custom ASIC
(1) Motion+driving+Processor combined in a single ASIC.
(Allows extremely high refresh rate)
d) Keyboard smart switch could also include active haptic feedback
e) Smart switch keyboard architecture can be used for hot-swappable implementation, but is also effective for soldered switches. (allows quick release of variants of Keyboard for the keyboard manufacturer, prevents requalification of emission, etc. CE/FCC)
f) Smart Switch could also include one or multiple RGB lighting features.
g) SmartSwitch could be done in either low or high profile mechanical switches.

(2) Keyboard Switch with an Identification Feature
1. Allows switch/technology specific communication protocol which can be important for smart switch platform/architecture
2. Same electrical line is used for both driving the analog motion sensor and for the identification of the switch type.
3. Identification could be done with a resistance limiting the discharge current providing a different RC constant between switch types.
4. Identification feature could be based on an on-board memory
5. Identification could be encrypted and used for switch authentication 3) 3+ pin Universal Socket
1. Three pin sockets with two aligned pins while retaining the two standard pins (compatible with standard socket)
(1) 2 aligned pins allows for a simple substrate (e.g., PCB) to be slid into the housing.
2. An additional power plane (Gnd, or power) that can be placed under the switch for an easy "always on" power connection through a connector (e.g., pogo pin, etc.)

4) Five Signals on Three Pins
1. Substrate is used as connection interface to the main PCB
2. Both sides of the PCB/substrate carry a different signal
3. Substrate connection pins could be even more complex and carry even more signals 2+ per pin.

5) Electronic Circuit/Schematic for multiple switch types interfacing
1. All smart switches can be individually addressed
(1) They could all be individually powered
(2) They could all share the same output
(3) They could all be powered at the same time.
2. Communication
(1) Four signals solution with Galvanic connecting internal analog drive signal (Input)
(2) Five signals solution with separated Analog & galvanic
(3) Five+ signal solution
(4) Communication could be a daisy chain between switches 6) Individual Key Dynamic Scanning
1. Only keys that are detected closed by the galvanic inputs are scanned with the analog function.
2. Individually addressed keys allows extremely high refresh rate as compared to typical analog scanning approaches.

7) Novel HMI on Keyboard Slot
1. Socket is capable of functioning as an interface for other types of input: Knobs, touch button, joystick, rocker, 2D touch panel, fingerprint sensor, RFID (NFC) reader in switch, Lightning features, proximity sensor etc.
2. A security switch with encrypted key for KB or computer login/authentication 8) Multi-slot keyboard modules for novel HMI
1. Socket capable to fit module bigger than one slot
2. When multiple slots are used, the communication path is enhanced and allows additional comm. protocols (e.g., communicate with one input device via multiple slots)
3. Potential modules: Displays (e.g., E-Ink, OLED), fader, rocker, knobs, fingerprint sensor, environmental sensor, microphone, speaker, trackpad, etc.

9) Wireless Smart Switches
1. Smart switches could be powered by the socket implementation, but communication could be done wirelessly
2. Power could also be done "wirelessly" through induction.
3. Keyboard could have no need for a main MCU, where all the wireless keys are communicating directly to the host.

Digital Smart Switches

Some embodiments may not have a processor in the keyswitch by default. However, some embodiments with an on-board processor can have a motion sensor+a processor in the keyswitch for digital communication with the processor and can set an activation threshold (or detection algorithm) directly on the key switch processor. Thus, instead of communicating an analog value (which may be slow to be processed by the MAIN MCU on the main PCB), we can process the value location and only provide the MAKE/BREAK to the MAIN MCU. This means that instead of being limited by the MAIN MCU ADC converting speed, typically lowering the report rate to 1-2 kHz, a very high report rate of 16 kHz or even 32 kHz or higher can be reached. In some aspects, all the above could be integrated in a custom ASIC.

Non-Switch Modules

In some aspects, an additional ground pad on the top side of the PCB can be added to support a pogo-pin addition to smart switches. Some Smart Keyswitches with more complex switching systems can include a knob on top (e.g., rotary encoder), joystick on top, or the like. Such larger switches may use multiple socket slots (e.g., still can fit in universal socket described above, but over multiple socket slots) and can include functionality such as a rocker on top, analog fader, OLED or E-ink screen, touch panel, or the like. One of ordinary skill in the art with the benefit of this disclosure would appreciate the many modifications, variations, and alternative embodiments thereof.

Miscellaneous Design Considerations

In some embodiments, driving electronics to drive the motion sensor (e.g., FIG. 7) can be in the housing, as presented above, however some implementations may have the driving electronics, or a portion thereof, outside of the keyswitch housing. In some cases, any suitable substrate can be used for the keyswitch include PCB, flex PCB, membrane, integrated circuit within key structure, embedded traces within key structure, or other substrate with electrical traces, as would be appreciated by one of ordinary skill in the art with the benefit of this disclosure. In some cases, the motion sensor system may alternatively or additionally include a force sensor system using FSR, strain gauge(s), or the like. Some embodiments may use capacitive sensing, inductive, optical, magnetic, or other suitable method of enabling motion sensing. Some embodiments that use magnetic sensing can use Hall Effect sensors, TMR sensors, or the like, as would be appreciated by one of ordinary skill in the art with the benefit of this disclosure.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A key structure comprising:

a housing;

a plunger extending from a top side of the housing and configured to be depressed and travel along a range of motion; and a motion sensor system integrated within the housing and configured to detect movement of the plunger along the range of motion and generate corresponding travel data, wherein one or more processors are configured to determine a position of the plunger along the range of motion based on the travel data.

2. The key structure of claim 1 further comprising driving electronics configured to control the motion sensor system.

3. The key structure of claim 2 wherein the driving electronics are contained within the housing of the key structure.

4. The key structure of claim 2 wherein the driving electronics are external to the housing of the key structure.

5. The key structure of claim 1 further comprising a substrate with electrical traces, wherein the motion sensor system is integrated on the substrate.

6. The key structure of claim 5 wherein the substrate is one of a printed circuit board (PCB), a membrane, an integrated circuit within the key structure, or embedded traces within the key structure.

7. The key structure of claim 5 wherein the motion sensor system includes:

an optical sensor;

a mutual capacitance sensor;

an inductive sensor; or a magnetic sensor.

8. The key structure of claim 7 wherein when the motion sensor system includes an optical sensor, the substrate includes:

a light emitting element; and a light detection element, wherein the plunger includes a shutter that blocks an amount of light from the light emitting element from reaching the light detection element based on the position of the plunger along the range of motion.

9. The key structure of claim 7 wherein when the motion sensor system includes an optical sensor, the substrate includes:

a light emitting element; and a light detection element, and wherein the plunger includes a reflector that reflects an amount of light from the light emitting element on to the light detection element based on the position of the plunger along the range of motion.

10. The key structure of claim 7 wherein when the motion sensor system includes an inductive sensor, the substrate includes:

a current driver; and an inductive coil driven by the current driver, wherein the plunger includes an electrically conductive element, and wherein a magnetic field produced by the inductive coil changes based on the position of the plunger along the range of motion.

11. The key structure of claim 7 wherein when the motion sensor system includes a magnetic sensor, the substrate includes:

a Hall Effect sensor or tunneling magnetoresistance (TMR) sensor, wherein the plunger includes a magnet, and wherein a strength of a magnetic field produced by the magnet detected by the Hall Effect or TMR sensor changes based on the position of the plunger along the range of motion.

12. The key structure of claim 7 wherein when the motion sensor system includes a mutual capacitance sensor, the substrate includes:

a plurality of conductive elements having a mutual capacitance between them;

a dielectric element coupled to the plunger; and a digital sensor integrated circuit configured to drive and read an amount of the mutual capacitance between the plurality of conductive elements, wherein a strength of a mutual capacitance between the plurality of conductive elements changes based on the position of the plunger and dielectric element relative to the plurality of conductive elements.

13. The key structure of claim 7 wherein the key structure further includes a galvanic contact for a galvanic switch.

14. A substrate with electrical traces configured to be integrated within a key structure for a keyboard, the substrate integrating thereon:

a motion sensor system configured to detect movement of a target element coupled to a depressible plunger of the key structure along a range of motion and generate corresponding travel data;

driving electronics configured to control the motion sensor system; and an interface circuit including multiple I/O pins operable to:

receive a drive signal to drive the motion sensor system;

receive electrical power to operate the motion sensor system; and provide an output signal including data corresponding to the motion sensor system.

15. The substrate of claim 14 wherein the substrate is one of a printed circuit board, a membrane, or an IMF.

16. The substrate of claim 14 wherein the multiple I/O pins are further operable to:

receive a drive signal to drive a galvanic detection system; and provide an output signal corresponding to a state of the galvanic detection system.

17. The substrate of claim 14 wherein the interface circuit is further configured to provide an identification signal operable to identify the key structure.

18. The substrate of claim 14 wherein the motion sensor system is an analog linear motion sensor system that utilizes:

an optical sensor system;

an inductive sensor system;

a magnetic sensor system; or a mutual capacitance sensor system.

19. The substrate of claim 14 wherein the motion sensor system is an analog linear motion sensor system and includes an optical sensor system comprising:

a light emitting element; and a light detection element, and a shutter element coupled to the plunger that blocks an amount of light from the light emitting element from reaching the light detection element based on a position of the plunger along the range of motion.

20. The substrate of claim 14 wherein the motion sensor system is an analog linear motion sensor system and includes an inductive sensor system comprising:

a current driver; and an inductive coil driven by the current driver, wherein the plunger includes an electrically conductive element, and wherein a magnetic field produced by the inductive coil changes based on a position of the plunger along the range of motion.

21. The substrate of claim 14 wherein the motion sensor system is an analog linear motion sensor system and includes a magnetic sensor system comprising:

a Hall Effect sensor, wherein the plunger includes a magnet, and wherein a strength of a magnetic field produced by the magnet detected by the Hall Effect sensor changes based on a position of the plunger along the range of motion.

22. The substrate of claim 14 wherein the motion sensor system is an analog linear motion sensor system and includes a mutual capacitance sensor system comprising:

a plurality of conductive elements having a mutual capacitance between them;

a dielectric element coupled to the plunger; and a digital sensor integrated circuit configured to drive and read an amount of the mutual capacitance between the plurality of conductive elements, wherein a strength of a mutual capacitance between the plurality of conductive elements changes based on a position of the plunger and dielectric element relative to the plurality of conductive elements.

* * * * *